United States Patent
Iguchi et al.

(10) Patent No.: US 7,639,884 B2
(45) Date of Patent: Dec. 29, 2009

(54) PREFILTER, COMPRESSIVE CODING PRE-PROCESSING APPARATUS AND DECOMPRESSIVE DECODING POST-PROCESSING APPARATUS, AND COMPRESSIVE CODING APPARATUS AND DECOMPRESSIVE DECODING APPARATUS

(75) Inventors: Kazuhisa Iguchi, Tokyo (JP); Seiichi Gohshi, Tokyo (JP); Shinichi Sakaida, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 717 days.

(21) Appl. No.: 11/409,254

(22) Filed: Apr. 24, 2006

(65) Prior Publication Data
US 2006/0239361 A1    Oct. 26, 2006

(30) Foreign Application Priority Data
Apr. 26, 2005 (JP) .............................. 2005-127636
Jun. 21, 2005 (JP) .............................. 2005-180983

(51) Int. Cl.
G06K 9/36    (2006.01)

(52) U.S. Cl. ..................... 382/232; 382/233; 382/260; 382/263

(58) Field of Classification Search .......... 382/232, 382/233, 260, 263, 264, 254; 386/9; 348/458, 348/E11.006, E7.005; 381/316, 312, 314; 375/240.21; 704/219, 222
See application file for complete search history.

(56) References Cited

U.S. PATENT DOCUMENTS 5,365,274 A * 11/1994 Seki et al. ..................... 348/458
6,134,373 A * 10/2000 Strolle et al. .................... 386/9
6,236,731 B1 * 5/2001 Brennan et al. ............. 381/316

FOREIGN PATENT DOCUMENTS

| JP | 2000-115765 | 4/2000 |
|----|-------------|--------|
| JP | 2004-297768 | 10/2004 |
| JP | 3611461     | 10/2004 |

OTHER PUBLICATIONS

Y. Ninomiya, "Muse-Hivision Transmission Method-;" Corona Publishing Co., Ltd.; Dec. 1990 (11 Sheets including cover sheet.)/ Discussed in the specification.

* cited by examiner

*Primary Examiner*—Anh Hong Do
(74) *Attorney, Agent, or Firm*—Kratz, Quintos & Hanson, LLP

(57) ABSTRACT

A prefilter for use in a compressive coding apparatus, the compressive coding apparatus including the prefilter for limiting a frequency band of an input image and a compressive coding unit for implementing compressive coding of an image signal of which frequency band is limited with the prefilter, the prefilter includes: a time filter unit; a two-dimensional filter unit; and an enhancement unit. A compressive coding pre-processing apparatus provided with the prefilter includes: a prefilter unit for attenuating a diagonal frequency component of each image; a pixel skipping unit for skipping a pixel of an image signal of which diagonal frequency component is attenuated by the prefilter unit by folding back a horizontal high frequency component to a vertical high frequency component, or folding back the vertical high frequency component to the horizontal high frequency component; and a pixel space contracting unit for contracting a space of the skipped pixel.

17 Claims, 12 Drawing Sheets

Two-dimensional low-pass filter

Configuration of a prefilter in an interlaced image

Configuration of a prefilter in an interlaced image

One-dimensional signal processing unable to apply a linear theory

PREFILTER, COMPRESSIVE CODING PRE-PROCESSING APPARATUS AND DECOMPRESSIVE DECODING POST-PROCESSING APPARATUS, AND COMPRESSIVE CODING APPARATUS AND DECOMPRESSIVE DECODING APPARATUS

CROSS REFERENCE TO RELATED APPLICATIONS

This application claims the foreign priority benefit under Title 35, United States Code, §119(a)-(d) of Japanese Patent Applications No. 2005-127637 and 2005-180983, filed on Apr. 26, 2005 and Jun. 21, 2005, respectively, the contents of which are hereby incorporated by reference.

BACKGROUND OF THE INVENTION

1. Field of the Invention

The present invention relates to a prefilter used for a compressive coding apparatus, and more particularly, relates to a prefilter suitable for the compressive coding apparatus which implements compressive coding of an input image into a low bit rate, and also relates to a compressive coding pre-processing apparatus for processing a motion picture before the compressive coding and a decompressive decoding post-processing apparatus for processing the motion picture after decompressive decoding, and a compressive coding apparatus provided with the compressive coding pre-processing apparatus and a decompressive decoding apparatus provided with the decompressive decoding post-processing apparatus.

2. Description of Relevant Art

In an image distribution with an ultra low bit rate using a transmission channel such as the Internet, satellite broadcasting, and ground waves, an image quality degradation of a distributed image accompanied with the compressive coding of the image is generated, in contrast with a conventional TV (television) broadcasting (analogue broadcasting, BS/CS digital broadcasting, and terrestrial digital broadcasting). For example, a service for distributing a broadcast content to a mobile terminal by using one segment of the terrestrial digital broadcasting has been supposed. In the service, an image signal of 15 Hz in maximum of QVGA (Quarter Video Graphics Array):(320 pixels×240 lines, or 320 pixels×180 lines) is distributed by implementing the compressive coding of the image signal into a ultra low bit rate at around 128 Kbps to 192 Kbps. If the image is implemented the compressive coding into such a ultra low bit rate like the above, various kinds of the image quality degradation are generated. For example, smoothness in motion is lost due to a generation of a frame skip, reading of superimposed characters becomes difficult, and a collapse of a whole screen may take place in some case.

For suppressing the image quality degradation described in the above, a method implementing prefiltering to the input image input to the compressive coding apparatus has been known. As a compressive coding apparatus using a prefilter, a compressive coding apparatus having a prefilter, which limits a frequency band of an input signal based on a variable originating from the image signal and transforms an image format, has been known. The technology is disclosed, for example, in Japanese Patent No. 3611461. In addition, the compressive coding apparatus provided with a prefilter, which outputs only a predetermined frequency component of the input image signal based on one or two parameters associated with coding processing such as a quantization parameter and a target bit rate, has been known. This technology is disclosed, for example, in Japanese Laid-Open Patent Publication No. 2004-297768.

When the prefiltering is not implemented for an input image, since an information volume of the input image is large, a compression rate (generally, a quantization parameter) of the compressive coding apparatus becomes too large for implementing the compressive coding of the input image into an ultra low bit rate, thereby resulting in significant generation of coding degradations, such as a block distortion and a mosquito distortion. In addition, in a region having a strong edge such as the superimposed characters, particularly, the coding degradation becomes remarkable. As a result, recognition of the superimposed characters of a decoded image becomes difficult.

In an image coding apparatus disclosed in the Japanese Patent No. 3611461, since an image signal which is band-limited by the prefilter is input in the compressive coding apparatus, an information volume of the input image is decreased, thereby resulting in prevention of undue image compression. As a result, the block distortion and the mosquito distortion are reduced.

However, since the prefilter includes two filter circuits in horizontal and vertical directions, and implements processing of the band limiting two times in the horizontal and vertical directions, a high frequency region is subjected to the band limiting in the horizontal and vertical directions. Therefore, in a region where a strong edge such as superimposed characters exists, an image of the edge becomes unclear. Particularly, when the image is compressively coded into a low bit rate, an edge portion of the superimposed characters becomes more unclear, and the caption is blended into the background, thereby resulting in difficulty for reading the superimposed characters in the decoded image.

Since a prefilter described in the Japanese Laid-Open Patent Publication No. 2004-297768 also removes a high frequency component, an image coding apparatus provided with the prefilter has the same problem with that of the above Japanese Patent No. 3611461. In addition, in the image coding apparatus described in the Japanese Laid-Open Patent Publication No. 2004-297768, since a control of the prefilter is implemented using a coding parameter of a compressive coding unit, it has been impossible to control the prefilter independently of the compressive coding unit. Therefore, a design freedom of the prefilter has been limited.

As a compressive coding scheme, for example, MPEG-2, MPEG-4, and AVC/H. 264 have been put into practical use in the past. Now, there exist many compressive coding schemes other than the above. The compressive coding schemes are configured with a motion compensation and a transform code (for example, DCT: Discrete Cosine Transform) as the base technologies, and have progressed remarkably in recent years.

These compressive coding schemes have a superior characteristic not to cause image quality degradation when a compression rate of the motion picture is low. The technology is disclosed in, for example, "MUSE-HIVISION TRANSMISSION METHOD-", written and edited by Yuuichi Ninomiya, published from CORONA PUBLISHING CO., LTD in December, 1990.

However, in a conventional compressive coding method, when the compression rate of the motion picture becomes high, a volume of information to be deleted for image compression becomes large, thereby resulting in difficulty for correctly restoring (reproducing original information as it was) the deleted information. As a result, a significant image quality degradation may be caused in some case.

Especially, in the conventional compressive coding method, when a coded motion picture is transmitted via a narrow band (low bit rate) transmission line having a low transmission bit rate although an original information volume of the motion picture is large, a significant image quality degradation of a decoded motion picture is caused if the compression rate of the motion picture is simply increased without any countermeasures. A demand for transmitting a motion picture without any image quality degradation has been increased, even if the motion picture is transmitted with a low bit rate more than ever through, for example, MPEG-2, MPEG-4, and AVC/H. 264, which have been put into practical use.

In addition, in a compressive coding apparatus employing the conventional compressive coding method (conventional compressive coding apparatus), when a complex motion picture is input and transmitted with a low bit rate, and when securing of a certain level of image quality is difficult, it is probable that a quantization step is set to be increased. For your information, to increase the quantization step is to increase a value of a number which divides a pixel value when a quantization value is calculated. The conventional compressive coding apparatus reduces a volume of information generation by increasing the quantization step, and implements the compressive coding of the motion picture within the low bit rate. However, if the quantization step is increased, a block noise is generated as well as fineness of the image which forms the motion picture is lost when the image is decoded, thereby resulting in significant image quality degradation.

It is, therefore, an object of the present invention to provide a prefilter which is used for a compressive coding apparatus suitable for implementing compressive coding of an input image into a low bit rate.

It is another object of the present invention to provide a prefilter which can maintain a good image quality of an image having a strong edge such as superimposed characters, as well as implementing an appropriate band limiting before compressive coding processing.

It is further object of the present invention to provide a prefilter which is independent from the subsequent compressive coding apparatus, as well as implementing an appropriate band limiting.

It is still further object of the present invention to provide a compressive coding pre-processing apparatus and a decompressive decoding post-processing apparatus, and a compressive coding apparatus and a decompressive decoding apparatus, which can solve the aforementioned issues and can prevent the image quality degradation when the compression rate of a motion picture is increased.

SUMMARY OF THE INVENTION

For eliminating the aforementioned issues, according to a first aspect of the present invention, there is provided a prefilter for implementing band limiting of an input image, and used for a compressive coding apparatus which comprises a compressive coding unit for implementing compressive coding of a band-limited image signal, the prefilter comprises: time filter means for limiting a band of a moving region of an image; two-dimensional filter means for cutting off a high frequency band component mainly of a diagonal direction other than horizontal and vertical directions of the image; and enhancement means for enhancing a frequency component of the horizontal and vertical directions of the image, wherein the input image is processed with the time filter means, and subsequently processed with the two-dimensional filter means or the enhancement means.

In the prefilter according to the present invention, since the band limiting is implemented mainly for a moving region and a diagonal direction of an image, a generation of a coding distortion is effectively prevented when the input image is compressively coded into a low bit rate, thereby resulting in effective prevention of a distributed image quality degradation. Especially, since two-dimensional filtering processing and enhancement processing are implemented after implementing the band limiting of temporal direction, for example, an issue that stationary superimposed characters become unclear can be prevented.

When the prefilter of the present invention is used for a compressive coding apparatus for implementing the compressive coding of the input image into an image signal of a low bit rate of which transmission rate is 64 Kbps to 192 Kbps, the prefilter achieves a special effect. Especially, in a compressive coding apparatus for broadcasting which uses one segment of terrestrial digital broadcasting for a mobile terminal, since an image of QVGA (Quarter Video Graphics Array), 15 Hz is compressively coded into a low bit rate of around 128 Kbps to 192 Kbps, the coding distortion such as a block distortion and a mosquito distortion can be prevented effectively by using the prefilter of the present invention. The invention is also effective in hi-vision transmission, and the optimal range of the transmission rate is 3 Mbps to 20 Mbps in this case for implementing the compressive coding.

According to a second aspect of the present invention, there is provided a prefilter in which the enhancement means of the prefilter comprises a first enhancer for enhancing the frequency component of a horizontal direction and a second enhancer for enhancing the frequency component of a vertical direction, and the input image is processed with the time filter means, subsequently, processed with the two-dimensional filter means, and after that, processing with the first enhancer or the second enhancer is implemented by turns.

According to a third aspect of the present invention, there is provided a prefilter in which the time filter means is an IIR time filter having a coefficient $\alpha$, and a range of the coefficient $\alpha$ is set to be $1/16$ to $3/16$. According to various kinds of experiments by the inventors for the coefficient $\alpha$ of the time filter, if the coefficient $\alpha$ becomes equal to or more than $3/16$, a geometric unsharpness in the moving region becomes significant, thereby resulting in an emotional image quality degradation. On the contrary, if the coefficient $\alpha$ becomes equal to or less than $1/16$, it has been found that the time filter has few effect. Accordingly, the coefficient $\alpha$ of the IIR time filter is preferable to be set as $1/16 < \alpha < 3/16$.

According to a fourth aspect of the present invention, there is provided a prefilter which comprises means for detecting a moving quantity of the input image, and controlling a filtering operation of the time filter means based on a detected moving quantity.

According to a fifth aspect of the present invention, there is provided a prefilter which comprises means for detecting a scene change of the input image, and at before and after a detected scene change, a filtering operation of the time filter means is suppressed. If a low-pass filter of temporal direction is applied without considering the scene change, different images are mixed, and a volume of information generation at the compressive coding unit may be increased. On the contrary, by stopping an operation of the low-pass filter at before and after the scene change, an issue that the different images are mixed is eliminated, and an increase of the information volume at the compressive coding unit can be suppressed.

According to a sixth aspect of the present invention, there is provided a compressive coding pre-processing apparatus comprising prefilter means for attenuating a diagonal frequency component of frequency components which compose an image of a motion picture before implementing compressive coding of the motion picture.

With the above configuration, the compressive coding pre-processing apparatus attenuates only the diagonal frequency component in a horizontal frequency component, a vertical frequency component, and the diagonal frequency component. That is, a diagonal resolution in the image is lowered (decreased) with the prefilter means. Meanwhile, the prefilter means is composed of, for example, a low-pass filter which lowers the diagonal resolution. The compressive coding pre-processing apparatus is equipped with the prefilter means by considering that a degradation of the diagonal resolution is hard to be detected, even if it is further decreased, from view point of a visual perception of human beings.

According to a seventh aspect of the present invention, there is provided a compressive coding pre-processing apparatus for reducing a number of pixels of each image which forms the motion picture before implementing the compressive coding of the motion picture, and the compressive coding pre-processing apparatus comprises prefilter means, pixel skipping means, and pixel space contracting means.

With the above configuration, the compressive coding pre-processing apparatus attenuates the diagonal frequency component of frequency components, which compose the image, with the prefilter means. Subsequently, the compressive coding pre-processing apparatus skips a pixel of an image signal of which diagonal frequency component is attenuated with the pixel skipping means, by folding back a horizontal high frequency component to a vertical high frequency component, or by folding back the vertical high frequency component to the horizontal high frequency component.

Then, the compressive coding pre-processing apparatus contracts a space of the pixel which has been skipped by the pixel skipping means, using the pixel space contracting means. That is, by contracting the space, where the pixel is cancelled (deleted), between the pixels, a number of pixel to be output to a coding unit which codes the motion picture can be drastically decreased.

According to a eighth aspect of the present invention, there is provided a compressive coding pre-processing apparatus, wherein the prefilter means comprises a field memory and a two-dimensional filter when the motion picture is an interlaced image.

With the above configuration, the compressive coding pre-processing apparatus delays a field image of the interlaced image with the field memory. Meanwhile, the interlaced image is configured with scanning lines which skip one line by each scanning line, and composed of the field image with odd number lines and that of even number lines. Then, the compressive coding pre-processing apparatus attenuates the diagonal frequency component of frequency components which compose successive field images formed with the field image (field image of the odd number lines or that of the even number lines) which is delayed a predetermined unit time with the field memory and the field image which is input at present, with the two-dimensional filter. Meanwhile, processing of the two-dimensional filter may be simply described as filtering in some case.

According to a ninth aspect of the present invention, there is provided a compressive coding pre-processing apparatus, wherein the prefilter means comprises a first field memory, a second field memory, a selector switch, and the two-dimensional filter.

With the above configuration, the compressive coding pre-processing apparatus delays the field image of the motion picture with the first field memory, and also delays the field image which is output from the first field memory with the second field memory. Subsequently, the compressive coding pre-processing apparatus switches the field image which is delayed a predetermined time unit by the second field memory and the field image which is input at present, to form a frame image unit with the selector switch.

Then, the compressive coding pre-processing apparatus attenuates the diagonal frequency component of frequency components, which compose the frame image unit comprising the field image which is output by switching the selector switch and the field image which is delayed a predetermined time unit by the first field memory, with the two-dimensional filter. Meanwhile, the processing of the two-dimensional filter may be simply described as filtering in some case.

According to a tenth aspect of the present invention, there is provided a decompressive decoding post-processing apparatus which approximates a coded image after being decoded to an original motion picture, the coded image being produced by the compressive coding of the motion picture after attenuating the diagonal frequency component of frequency components which compose the image of the motion picture, and the decompressive decoding post-processing apparatus comprises interpolation filtering means.

With the above configuration, the decompressive decoding post-processing apparatus attenuates a noise component, which is generated in a diagonal direction, of the decoded image decoded from the coded image with the interpolation filtering means. That is, the interpolation filtering means restores an image approximated to the original motion picture (initial motion picture) by removing the noise component generated at decoding, namely, by removing the horizontal high frequency component or the vertical high frequency component which is folded back at a transmitting (coding) side.

According to a eleventh aspect of the present invention, there is provided a decompressive decoding post-processing apparatus which approximates the coded image after being decoded to the original motion picture, the coded image being produced by skipping a pixel of an image signal of which diagonal frequency component of frequency components which compose the image of the motion picture is attenuated and by implementing the compressive coding of the motion picture after contracting the space formed by skipping the pixel, and the decompressive decoding post-processing apparatus comprises pixel space securing means, pixel adding means, and the interpolation filtering means.

With the above configuration, the decompressive decoding post-processing apparatus secures a predetermined space between the pixels of the decoded image decoded from the coded image with the pixel space securing means. A number of pixels of the decoded image, which is decoded from the coded image, are reduced from that of the original motion picture since the decoded image is decoded from the coded image which is coded after reducing a number of pixels. Therefore, the space is secured with the pixel space securing means by expanding a gap between pixels which have not been deleted for adding a new pixel to a position where a deleted initial pixel has been existed.

Subsequently, the decompressive decoding post-processing apparatus adds a pixel which has a predetermined pixel value with the pixel adding means in a position of the space secured by the pixel space securing means, and removes the noise component, which is generated in a diagonal direction, corresponding to the pixel added by the pixel adding means, with the interpolation filtering means.

According to a twelfth aspect of the present invention, there is provided a compressive coding apparatus comprising the compressive coding pre-processing apparatus and compressive coding means for implementing the compressive coding of a motion picture which is output from the compressive coding pre-processing apparatus.

With the above configuration, the compressive coding apparatus implements the compressive coding of the motion picture which is output from the compressive coding pre-processing apparatus with the compressive coding means to form the coded image. Meanwhile, a compressive coding scheme employed in the compressive coding means may be any one of compressive coding schemes, for example, MPEG-2 and AVC/H.264, which have been put into practical use.

According to a thirteenth aspect of the present invention, there is provided a decompressive decoding apparatus comprising decoding means for decoding the coded image which is output from the compressive coding apparatus and the decompressive decoding post-processing apparatus.

With the above configuration, the decompressive decoding apparatus decodes the coded image output from the compressive coding apparatus by the decoding means. Meanwhile, a decompressive decoding scheme employed in the decoding means may be any one of decoding schemes, for example, MPEG-2 and AVC/H.264, which have been put into practical use.

According to the first to fifth aspects of the present invention, since a prefilter according to the present invention implements a band limiting mainly for a moving region and a diagonal direction of an image, an image quality degradation is effectively prevented when the compressive coding of an input image is implemented with a low bit rate. In addition, a problem such that a region having a strong edge such as Superimposed characters become unclear can be eliminated, by enhancing the horizontal and vertical directions.

According to the sixth aspect of the present invention, a volume of information generation at coding of the motion picture can be reduced by attenuating the diagonal frequency component, which has less effect on the image degradation from view point of visual perception of human beings. In other word, since an information volume of the coded image can be suppressed, the present invention is applicable to a case where the compression rate of the motion picture at coding is high. In addition, since the diagonal frequency component is attenuated, a decrease of fineness of the image quality and a generation of a block noise can be suppressed, thereby resulting in prevention of the image quality degradation.

According to the seventh aspect of the present invention, the volume of information generation at coding of the motion picture can be reduced by attenuating the diagonal frequency component, which has less effect on the image degradation from view point of visual perception of human beings. In addition, since the space between the pixels is contracted, the decrease of fineness of the image quality and the generation of the block noise can be suppressed even if the coded image is transmitted with a low bit-rate by increasing the compression rate of the motion picture at coding, thereby resulting in prevention of the image quality degradation.

According to the eighth aspect of the present invention, in the interlaced image, the diagonal frequency component can be attenuated efficiently by delaying one field image by a predetermined time unit and by implementing the filtering of the one field image together with the another field image, thereby resulting in prevention of the image quality degradation.

According to the ninth aspect of the present invention, the diagonal frequency component can be attenuated efficiently by alternately outputting the field image at present and the field image which is delayed a predetermined time unit and by implementing the filtering by the frame unit, thereby resulting in prevention of the image quality degradation.

According to the tenth aspect of the present invention, the decrease of fineness of the decoded image quality and the generation of the block noise can be suppressed by removing the noise component which is generated in a diagonal direction, even when the compression rate of the coded image is high, thereby resulting in prevention of the image quality degradation.

According to the eleventh aspect of the present invention, the decrease of fineness of the decoded image quality and the generation of the block noise can be suppressed by securing a predetermined space between pixels of the decoded image decoded from the coded image, by adding a pixel, and by removing the noise component, which is generated in a diagonal direction, corresponding to an added pixel, thereby resulting in prevention of the image quality degradation.

According to the twelfth aspect of the present invention, the motion picture can be transmitted by coding so as to suppress the image quality degradation of the decoded image after being decoded by attenuating the diagonal frequency component of the motion picture in advance, even when transmission of the motion picture is implemented with a low bit-rate more than ever by employing a conventional compression scheme.

According to the thirteenth aspect of the present invention, the decoded image can be approximated to the original motion picture by removing the noise component which is generated in a diagonal direction of the motion picture, after decoding the coded image with the decompressive decoding post-processing apparatus, even if the coded image is transmitted with a low bit-rate more than ever by employing a conventional compression scheme.

DETAILED DESCRIPTION OF THE PREFERRED EMBODIMENT

Next, embodiments of the present invention will be explained in detail by referring to figures, as needed.

<<Prefilter>>

First Embodiment

Figure 1:
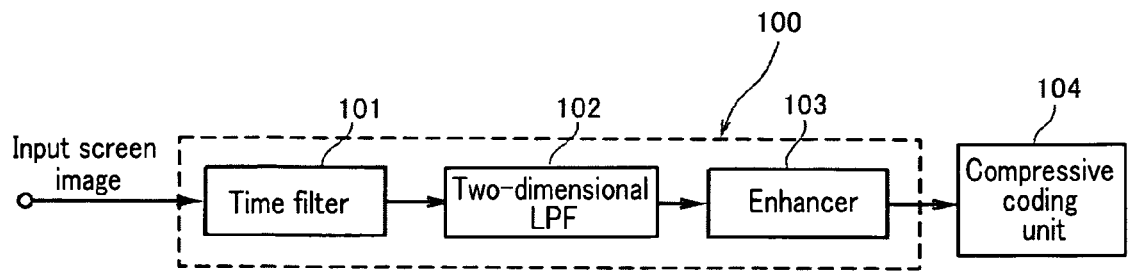
FIG. 1 is an illustration showing an example of a prefilter according to an embodiment of the present invention.

FIG. 1 is an illustration showing an example of a prefilter according to a first embodiment of the present invention. The prefilter according to the embodiment is preferably employed to a compressive coding apparatus, which includes a prefilter 100 for implementing band limiting of an input image and a compressive coding unit 104 for implementing compressive coding of a band-limited input image signal. Especially, the prefilter is suitable for the compressive coding apparatus which is used for serving a distribution of an image to a mobile terminal at a low bit rate by making use of one segment of terrestrial digital broadcasting. Here, the low bit rate, in which the present invention can be used preferably, may be fall within a range of 64 Kbps to 192 Kbps. The present invention is also effective in hi-vision transmission. In this case, an optimal range of the transmission rate is 3 Mbps to 20 Mbps for implementing the compressive coding.

The prefilter 100 according to the embodiment includes a time filter 101, a two-dimensional low-pass filter 102, and an enhancer 103, and implements an appropriate band limiting of the input image, then transfers the image signal of which high frequency component of the image is removed to the subsequent compressive coding unit 104.

The input image is first input into the time filter 101. The time filter has a function of limiting a band of a moving region of the image as well as removing noises included in the input image, and can be configured with a common low-pass filter of temporal direction, such as a FIR (Finite Impulse Response) filter and an IIR (Infinite Impulse Response) filter. The time filter implements band limiting only for the moving region, and does not operate on a stationary region, such as superimposed characters. Therefore, information of the superimposed characters is not reduced.

Figure 2:
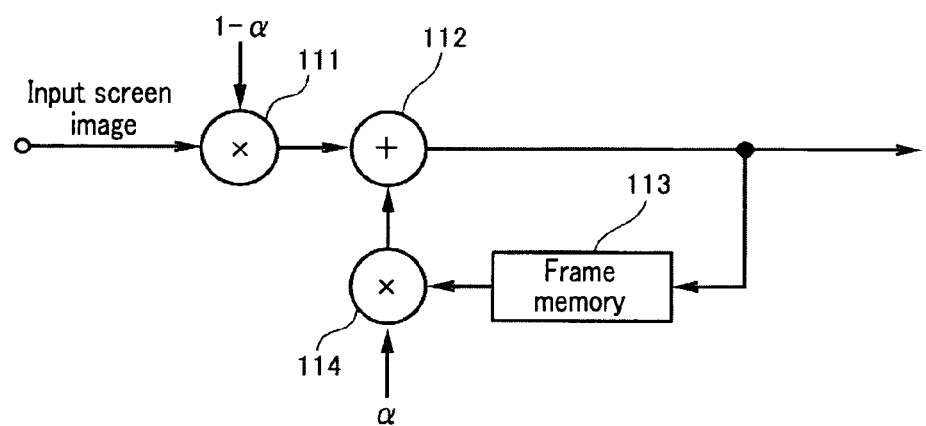
FIG. 2 is an illustration showing an example of a time filter.

FIG. 2 is an illustration showing an example of the time filter configured with the IIR filter. An input image signal is input into a first multiplier 111, multiplied by a coefficient $1-\alpha$, and the result is input to an adder 112. An output of the adder 112 is input in a frame memory 113, and an output of the frame memory is supplied to the adder 112 after being multiplied a coefficient $\alpha$ at a second multiplier 114. In the adder 112, a signal which is multiplied by the coefficient $1-\alpha$ is added to a signal which is multiplied by the coefficient $\alpha$ via the frame memory 114 to form an output signal. When the coefficient $\alpha$ is too small, an effect of the time filter becomes weak, and when the coefficient $\alpha$ is too large, a geometric unsharpness of the moving region is caused. A value around $1/16$ to $3/16$ is preferable for the coefficient $\alpha$ of the IIR filter. Meanwhile, It has been found that $\alpha=2/16$ is the most preferable value according to an experiment in which an image of 15 Hz was compressively coded into a low bit rate of 128 Kbps with 320 pixels×240 lines and an AVC (Advanced Visual Communication)/H.264 scheme. Since the IIR filter shown in FIG. 2 has only one coefficient, an adjustment is relatively simple and a circuit is small. Accordingly, the IIR filter has an advantage that the filter can be configured easily even if the filter is configured with software.

Figure 3:
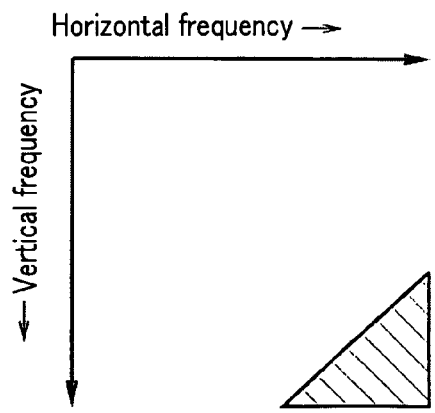
FIG. 3 is an illustration for explaining an information volume reduction in a compressive coding apparatus.
Figure 4:
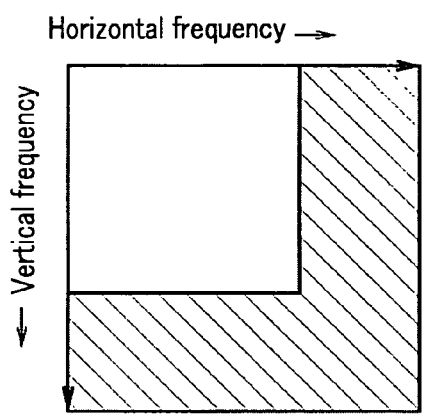
FIG. 4 is an illustration showing a cutoff frequency region when a horizontal filter and a vertical filter are combined.

An output from the time filter 101 is input into the two-dimensional low-pass filter 102. In an image compressive coding scheme which is commonly used such as MPEG-1, MPEG-2, MPEG-4, and AVC/H.264, an information volume of a high frequency component in a diagonal direction (diagonal high frequency component) of the image is removed most, if the image is viewed as a two-dimensional signal when the input image is compressed. This is shown in FIG. 3. FIG. 3 is a schematic illustration of a two-dimensional frequency characteristic of an image, where a horizontal axis indicates a frequency in a horizontal direction (horizontal frequency) and a vertical axis indicates a frequency in a vertical direction (vertical frequency). In a common compressive coding unit, the information volume of the diagonal high frequency component other than the horizontal and vertical frequency components of the image, which is shown with an area of diagonal lines in FIG. 3, is removed most. However, since an information reduction of the compressive coding unit is implemented by each small block such as 8 pixels×8 lines, a block distortion and a mosquito distortion are caused if an input image is coded into a low bit rate. On the other hand, when a prefilter is formed by combining a one-dimensional horizontal filter and a one-dimensional vertical filter like the prefilter used for the image coding apparatus described in the aforementioned Japanese Patent No. 3611461, the horizontal and vertical high frequency components as well as the diagonal high frequency component are removed as shown in FIG. 4. As a result, a resolution of the Superimposed characters decreases, thereby resulting in blending of the superimposed characters of a decoded image into the background.

Figure 5:
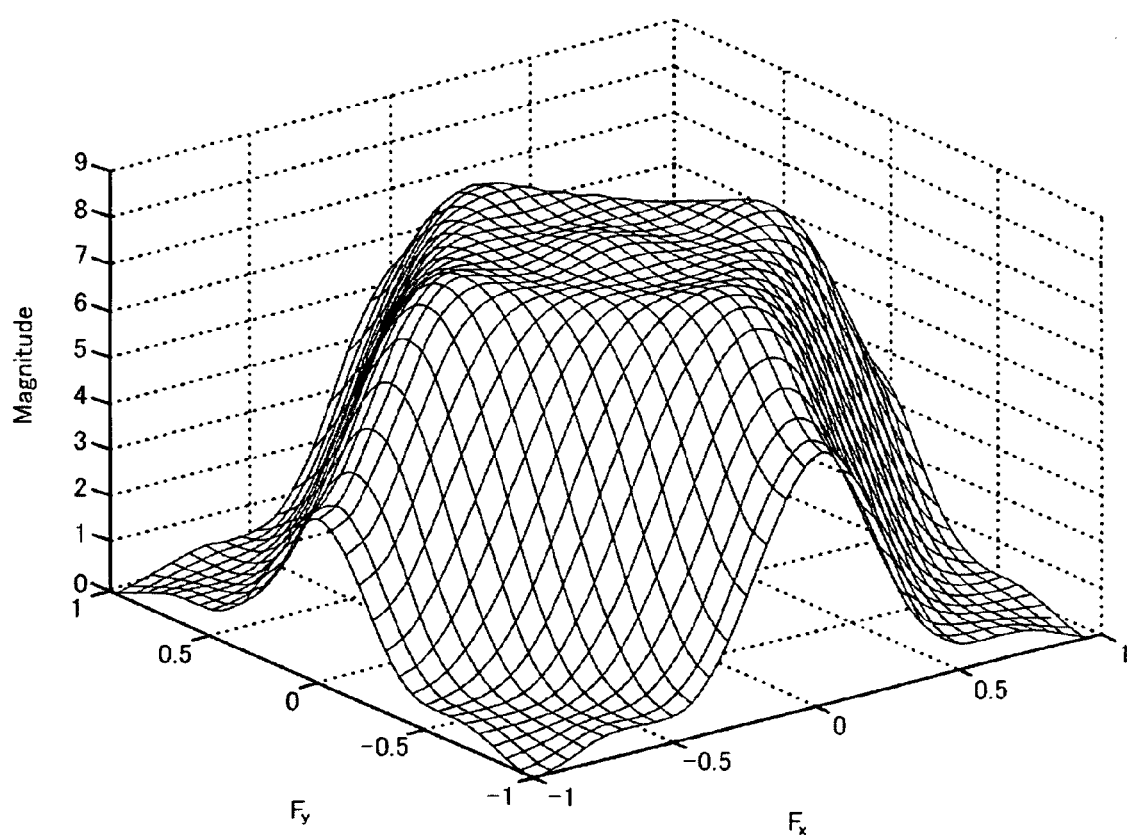
FIG. 5 is an illustration showing an attenuation characteristic of a two-dimensional filter.

For eliminating the above disadvantage of the conventional prefilter, the two-dimensional low-pass filter 102, which is different from the low-pass filter combining two one-dimensional low-pass filters, is employed in the present invention. The two-dimensional low-pass filter 102 mainly cuts off the diagonal high frequency component other than the horizontal and vertical high frequency components, and only attenuates the horizontal and vertical high frequency components without cutting off the components. A transmission characteristic of the two-dimensional low-pass filter is shown in FIG. 5. Using the two-dimensional low-pass filter having a characteristic like the above, an appropriate information reduction of the diagonal high frequency component of the input image can be achieved without causing an over-decrease of the resolution of an image which has a strong edge such as the superimposed characters.

Figure 6:
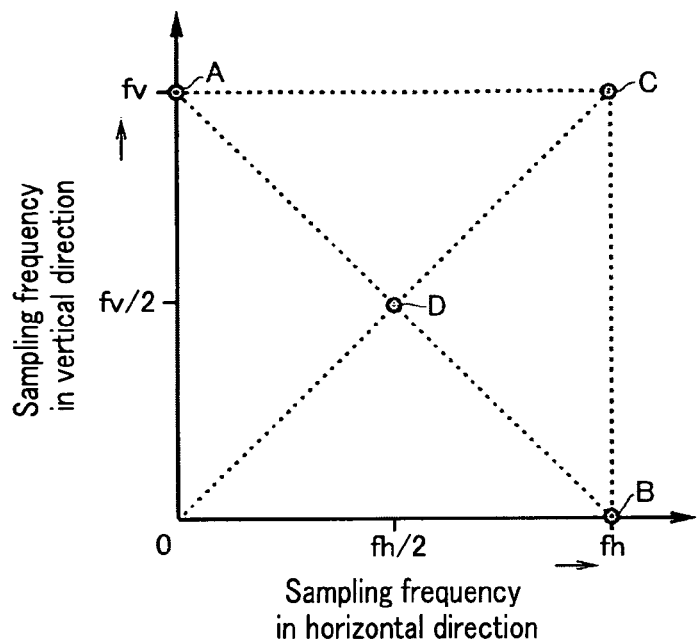
FIG. 6 is an illustration showing an optimal characteristic of a two-dimensional low-pass filter.

An example of an optimal characteristic of the two-dimensional low-pass filter is shown in FIG. 6. FIG. 6 shows a two-dimensional frequency characteristic of an input image, and a horizontal axis indicates a sampling frequency $f_h$ in a horizontal direction and a vertical axis indicates a sampling frequency $f_v$ in a vertical direction. A Nyquist frequency in the horizontal direction is indicated with $f_h/2$, and that of in the vertical direction is indicated with $f_v/2$. An area shown with a symbol A indicates the region having a maximum frequency of the vertical direction, the symbol B indicates a region having the maximum frequency of the horizontal direction, the symbol C indicates a region having the maximum frequencies of the vertical and horizontal directions, that is, the region having the maximum frequency of the diagonal direction, and the symbol D indicates a region having half of the maximum frequency of the diagonal direction. The optimal two-dimensional filter to be employed in the present invention has characteristics such that an attenuation rate of the areas shown with the symbols A and B is 0 dB to 3 dB, that of the symbol D is 3 dB to 20 dB, and the area shown with the symbol C has a cutoff characteristic.

Figure 7:
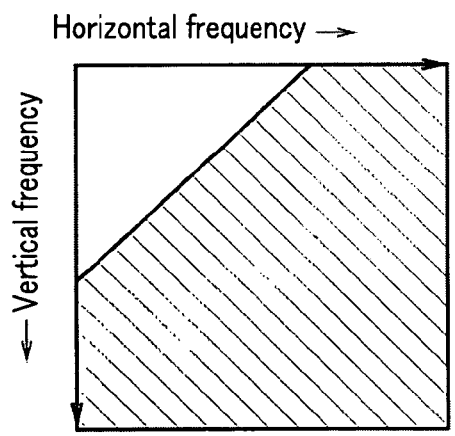
FIG. 7 is an illustration for explaining an information volume reduction in a compressive coding apparatus.

An image signal passed through the two-dimensional low-pass filter 102 is put into the enhancer 103 and enhanced. When compressive coding of the image signal is implemented into a low bit rate, there is a possibility such that not only information of the diagonal high frequency component, but also information of the horizontal and vertical high frequency components of the image is removed in the compressive coding unit which is connected at subsequent stage of the enhancer 103. This is shown in FIG. 7. When a large information reduction like the above is performed at the subsequent compressive coding unit, a coded image quality of a region such as the superimposed characters which includes edges in the horizontal and vertical directions is substantially degraded. On the other hand, if the horizontal high frequency component and the vertical high frequency component are amplified at the prefilter, the image quality of the superimposed characters is improved only at an instant (only block at the instant, or only frame at the instant). However, a volume of generating information to be subjected to the compressive coding substantially increases, thereby resulting in undue compressive coding at the subsequent compressive coding unit. By contraries, an image quality degradation such as the block distortion increases, thereby resulting in increase of the image quality degradation of the superimposed characters.

For eliminating the above drawback, the enhancer 103 is arranged at the subsequent stage of the two-dimensional low-pass filter in the present invention. The enhancer 103 operates not to enhance all of the directional components of the image, but enhances only the horizontal frequency component and the vertical frequency component of the image. That is, the enhancer 103 operates to compensate the horizontal and vertical components which have been attenuated with the two filters at the previous stages. As a result, the image quality degradation of the image such as the superimposed characters which substantially include horizontal and vertical component information can be prevented. Meanwhile, the enhancer is preferable to mainly enhance low and middle frequency bands which are lower frequency bands than a cutoff frequency of the two-dimensional low-pass filter 102.

In addition, the enhancer 103 is preferable to be formed with a combination of two one-dimensional enhancer devices, one is for enhancing a horizontal component and the other is for enhancing a vertical component, and to implement enhancement processing for the horizontal direction or the vertical direction in turns.

Coefficients of the enhancer can be set as follows as an example.

(Coefficients when the enhancer is configured with the FIR filter with three taps)
−0.1 to −0.15, 1, −0.1 to −0.15 or, (Coefficients when the enhancer is configured with the FIR filter with five taps)
−0.1 to −0.15, 0, 1, 0, −0.1 to −0.15

Characteristics of the vertical and horizontal enhancer devices are preferable to be designed so that a peak of a gain is located in a range of ¼ to ½ of the Nyquist frequency. The reason is that if a peak frequency is too low, an effect of the enhancer becomes small, on the contrary, if the peak frequency is too high, information is generated too much, thereby resulting in losing of an improvement effect of the coded image quality. Further, the gain is preferably in a range of 1 dB to 6 dB. The reason is that if the gain is too small, the effect of the enhancer is lost, if the gain is too large, it causes a emotional image quality degradation due to increase of an information volume and over enhancement.

In the present embodiment, the order of processing in the prefilter is as follows. First, the band limiting is performed mainly for a moving region of an input image by using the time filter. Next, the information reduction is performed mainly for the diagonal component of the image by using the two-dimensional low-pass filter. After that, the enhancement processing of the horizontal and vertical components is performed by the enhancer. These processing are performed independently from the subsequent compressive coding unit 104. Therefore, a prefilter independent of the operation of the compressive coding unit can be realized, thereby resulting in improvement of a design freedom.

Second Embodiment

Figure 8:
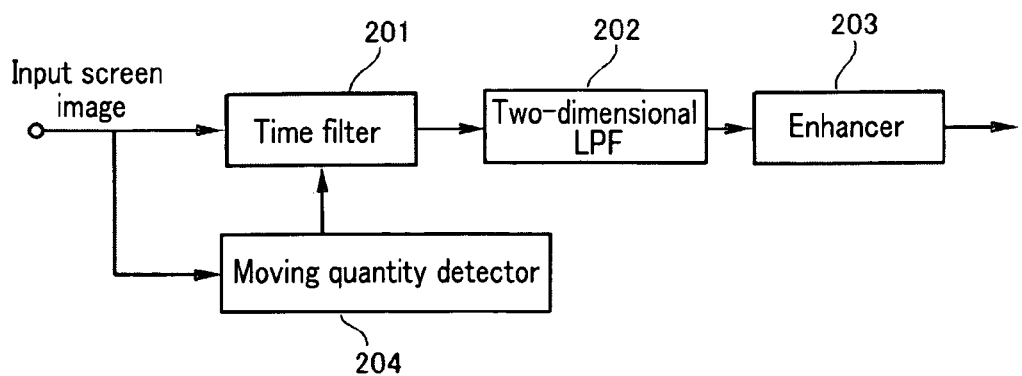
FIG. 8 is an illustration showing a modification of a prefilter according to a second embodiment of the present invention.

FIG. 8 is an illustration showing a prefilter according to a second embodiment of the present invention. Meanwhile, since a time filter 201, a two-dimensional low-pass filter 202, and an enhancer 203 are identical with those of the aforementioned embodiment, explanations on them will be omitted. In the present embodiment, a moving quantity detector 204 is disposed, an input image is divided into blocks, a size of a moving quantity at each block is measured, and a strength of the time filter 201 is controlled in response to a detected moving quantity. A control of the filter strength of the time filter 201 is practiced in such a manner that, when a small movement is detected, the filter strength is increased, and when a large movement is detected, a normal filter strength is applied. Accordingly, noises are removed for a stationary image, and a strong band limiting is applied for a slow motion picture.

Figure 9:
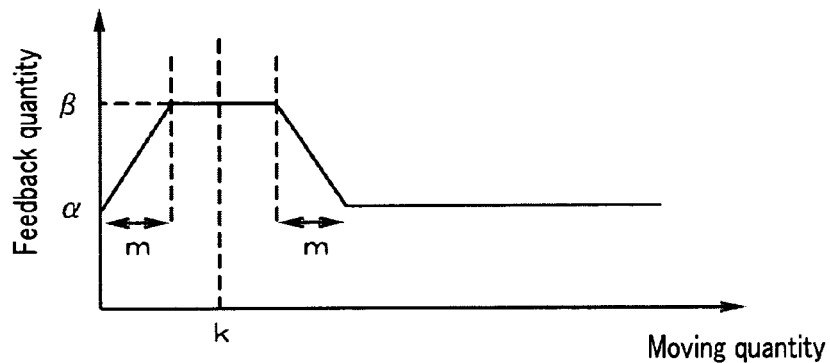
FIG. 9 is an illustration showing a control characteristic of time configured with an IIR filter according to a second embodiment of the present invention.

An example of the control where the IIR filter shown in FIG. 2 is used as the time filter 201, is shown in FIG. 9. In FIG. 9, a horizontal axis indicates the moving quantity, and a vertical axis indicates a feedback quantity of the IIR filter. In the aforementioned experiment where AVC/H.264 is used, a good result was obtained with $\alpha=1/16$, $\beta=3/16$. In addition, regarding k and m, a good result has been obtained with k=1.0 to 2.0, m=0.5 of a size of a motion vector.

As a moving quantity detection method of the moving quantity detector 204, an example of the method based on a gradient method is shown here. The moving quantity V(n, S) of a block S in a given frame n is calculated from the following formula.

$$V(n, S) = \underset{(x,y) \in S}{median}(g(n, x, y))$$

Here, median(g(n, x, y)) is a median filter. g(n, x, y) is a moving quantity of a coordinate (x, y) in the frame n, and calculated from the next formula.

$$g(n, x, y) = |diff(n, x, y)| / |f_x(n, x, y)| + |f_y(n, x, y)|$$

g(n, x, y)=0 if the denominator of the above formula becomes 0 (zero). Here, diff(n, x, y), $f_x$(n, x, y), and $f_y$(n, x, y) are a difference of luminance, a gradient in a horizontal direction, and a gradient in a vertical direction, respectively, between the frame n and a frame n−1 at the coordinate (x, y) in the frame n, and calculated from the following formulas.

$$diff(n, x, y) = I(n-1, i, j) - I(n, i, j)$$

$$f_x(n, i, j) = (I(n, i+1, j) - I(n, i-1, j))/2$$

$$f_y(n, i, j) = (I(n, i, j+1) - I(n, i, j-1))/2$$

Here, I(n, i, j) is a luminance value at the coordinate (x, y) of the frame n.

In a motion vector detection using the gradient method, there is a problem that a large movement can not be correctly detected in general. However, as described in the above, since only a small movement is important in the present invention, no problem is encountered even if the moving quantity detection which uses the gradient method is used. In addition, other than the gradient method, a block matching method and the motion vector which is detected at the subsequent compressive coding unit may be used. Further, necessary information of the moving quantity is only a quantity of the movement, and a direction is unnecessary.

Operation effects of the embodiment are as follows. The time filter 201 produces a significant effect proportional to strength of a filter effect of temporal direction. However, if a strong filter effect of temporal direction is applied to an object having a large moving quantity, the image is doubled, thereby resulting in a possibility for generating redundant information at the subsequent compressive coding unit. In the embodiment, since an effect of the low-pass filter of temporal direction is enhanced only for the region where the moving quantity is small, a negative effect for the region where the moving quantity is large is suppressed, while effectively making use a strong effect of the low-pass filter.

Third Embodiment

Figure 10:
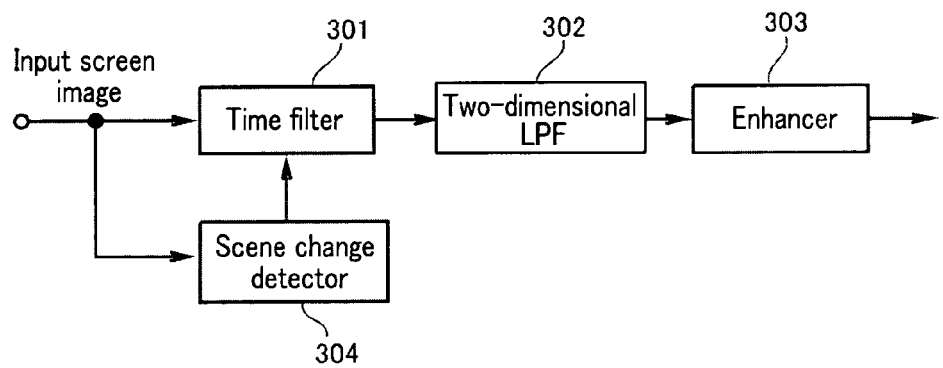
FIG. 10 is an illustration showing a prefilter according to a third embodiment of the present invention.

FIG. 10 is an illustration showing a configuration of a prefilter according to a third embodiment of the present invention. Meanwhile, in the embodiment, a two-dimensional filter 302 and an enhancer 303 are identical with those of shown in FIG. 1. In the present embodiment, a scene change detector 304 is disposed, and a time filter 301 is controlled by a control signal from the scene change detector 304. That is, when a scene change occurs in an image, the scene change detector 304 controls the time filter 301 by the control signal from the scene change detector 304 so as not to spread the effect of the time filter 301 at times before and after the scene change. For example, if the time filter 301 is configured with the IIR filter shown in FIG. 2, the feedback quantity $\alpha$ is equal to "0" ($\alpha=0$) when the scene change happens. Meanwhile, the scene change detector can be formed with a detection method of a simple configuration by using, for example, a difference between frames.

Figure 11:
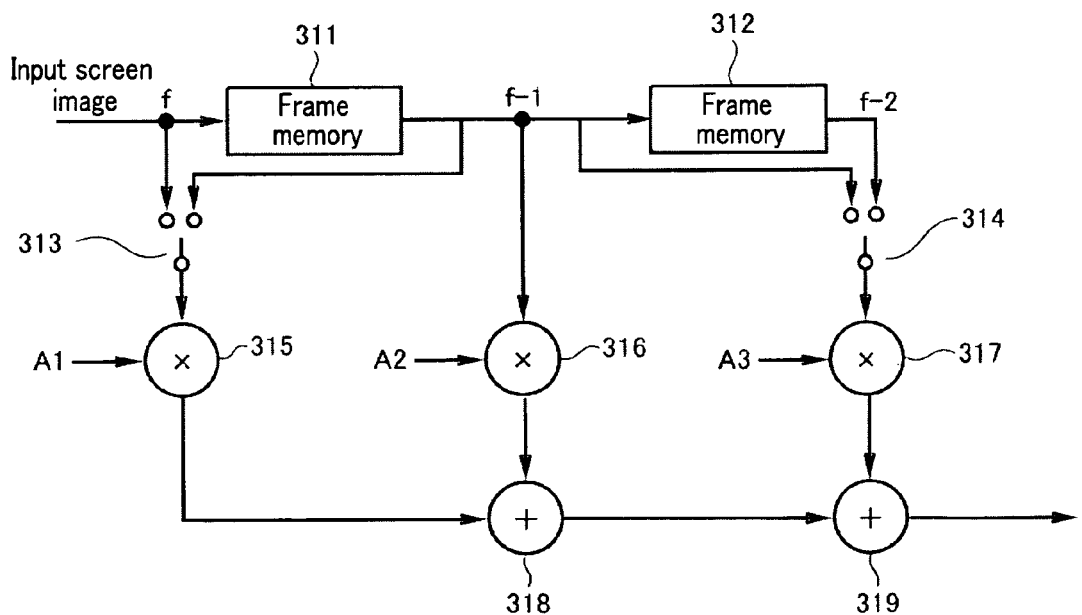
FIG. 11 is an illustration showing an example of a time filter configured with a FIR filter according to the third embodiment.

FIG. 11 is an illustration showing an example of a time filter configured with a FIR filter with three taps in the third embodiment. Symbols 311 and 312 denote frame memories, and symbols 313 and 314 denote switching devices. In addition, symbols 315 to 317 denote multipliers, which multiply coefficients A1 to A3, respectively. Meanwhile, as examples of these coefficients, the coefficients may be set as, A1=0.05, A2=0.9, and A3=0.05, respectively. In addition, denoted by symbols 318 and 319 are adders. In a normal operation, a first switching device 313 selects an input signal, and a second switching device 314 selects an output from a second frame memory 312. If a scene change is detected between a frame f-2 and a frame f-1, the second switching device 314 selects an output of a first frame memory 311 by the control signal from the scene change detector. If a scene change is detected between the frame f-1 and a frame f, the first switching device 313 selects an output from the first frame memory 311. When the FIR filter is used for the time filter like the above, the time filter can be configured so that an effect of a low-pass filter of temporal direction does not spread in response to a detection of the scene change.

Advantages of the present embodiment are as follows. If a low-pass filter of temporal direction is employed without considering the scene change, different images are mixed at times before and after the scene change (if the time filter is configured with a IIR filter, at the time after the scene change), and a volume of information generation at the compressive coding unit is increased, as well as the effect of the time filter is lost. On the contrary, by detecting the scene change, and by removing the effect of the low-pass filter at times before and after the scene change, an increase of the information volume at the compressive coding unit can be suppressed, as well as an issue that the different images are mixed can be eliminated.

<<COMPRESSIVE CODING PRE-PROCESSING APPARATUS AND DECOMPRESSIVE DECODING POST-PROCESSING APPARATUS, AND COMPRESSIVE CODING APPARATUS AND DECOMPRESSIVE DECODING APPARATUS>>

Next, a compressive coding pre-processing apparatus and a decompressive decoding post-processing apparatus, and a compressive coding apparatus and a decompressive decoding apparatus will be explained in detail by referring to figures, as needed.

Fourth Embodiment

<CONFIGURATION OF COMPRESSIVE CODING APPARATUS, THE FIRST>

Figure 12:
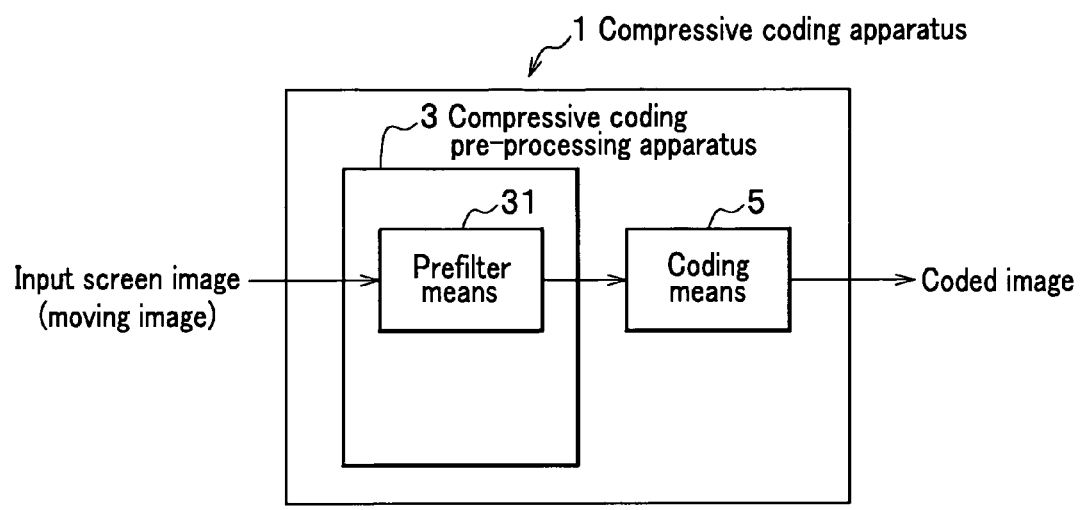
FIG. 12 is a block diagram of a compressive coding apparatus (including a compressive coding pre-processing apparatus (the first embodiment)) according to an embodiment of the present invention.

FIG. 12 is a block diagram of a compressive coding apparatus (including a compressive coding pre-processing apparatus). As shown in FIG. 12, a compressive coding apparatus 1 includes a compressive coding pre-processing apparatus 3 and a coding means 5.

The compressive coding pre-processing apparatus 3 implements processing of an input image, that is, an image which forms a motion picture, before compressive coding of the input image (motion picture, image signal), and includes prefilter means 31. The compressive coding pre-processing apparatus 3 may be included in the compressive coding apparatus 1 in some case and may be an external apparatus in other case.

The prefilter means 31 attenuates a frequency component in a diagonal direction (diagonal frequency component) of frequency components which compose the image forming the motion picture. Namely, the prefilter means 31 attenuates only the diagonal frequency component of the image which forms the motion picture, while maintaining a frequency component in a horizontal direction and a frequency component in a vertical direction of the frequency components which compose the image, thereby resulting in reduction of a volume of information which is input in the coding means 5.

Meanwhile, the diagonal frequency component means a component of coordinates which have a same distance from an X-axis and Y-axis, if an image plane is assumed by configuring that a horizontal frequency (frequency component in a horizontal direction) is u (X-axis) and a vertical frequency (frequency component in a vertical direction) is v (Y-axis).

Further, the meaning of attenuating of the diagonal frequency component is to remove a component which includes four coordinates located at a same distance from the X-axis and the Y-axis in the image plane. To be more accurate, it is to remove a component (high frequency component) of an area which is formed by subtracting a second square from a first square. The first square is formed by uniting four coordinates located at a same distance from the X-axis and the Y-axis on the basis of an origin of the image plane. The second square, which is rotated 90 degrees from the first square, is formed by uniting four cross points between the X-, Y-axes and each side of the first square.

If a coded image, which has been coded by the coding means 5 after the diagonal frequency component is attenuated, is decoded, there is few effect on a visual perception of human beings even if the diagonal frequency component is attenuated. As a result, a decrease of fineness of the image quality can be suppressed, thereby resulting in prevention of the image quality degradation.

In the prefilter 31, an attenuation rate of the diagonal frequency component is predetermined by a filter factor which is set in advance of a filter installed in the prefilter.

The coding means 5 codes the motion picture output from the compressive coding pre-processing apparatus 3. Compressive coding schemes which may be employed in the coding means 5 includes, for example, MPEG-2 and AVC/H.264.

Figure 14:
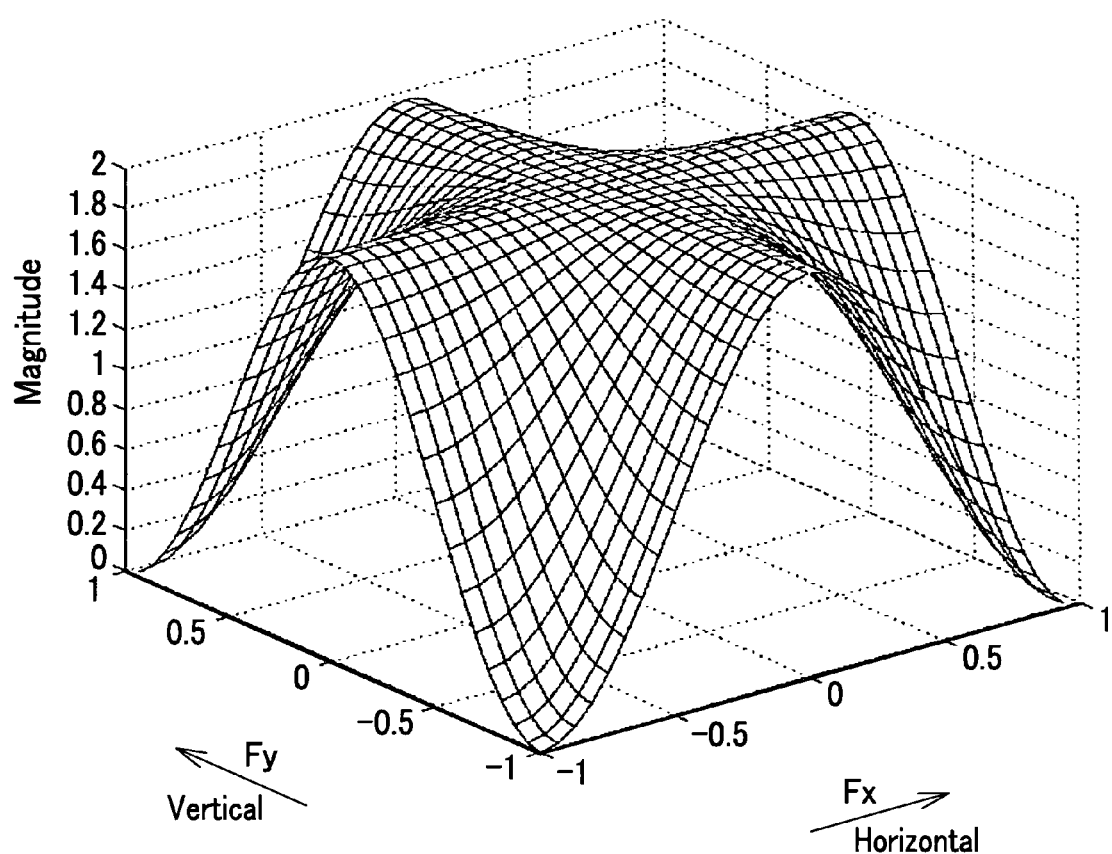
FIG. 14 is an illustration for explaining a filter characteristic of a filter installed in a prefilter means.

Here, a filter characteristic of the filter (two-dimensional low-pass filter) which is installed in the prefilter means 31 will be explained by referring to FIG. 14. As shown in FIG. 14, the filter characteristic forms a concave-convex surface which is drawn by crossing curves in a coordinate space configured with a horizontal direction Fx, a vertical direction Fy, and a level direction (magnitude, hereinafter, referred to as Ma (power level Ma)).

The filter characteristic shown in FIG. 14 has coordinates, (Fx, Fy, Ma)=(0, 0, 2), (0, −1, 2), (−1, 0, 2), (0, 1, 2), and (1, 0, 2) in the coordinate space. That is, when (Fx, Fy)=(0, 0), (0, −1), (−1, 0), (0, 1), and (1, 0), the power level (passing level) Ma becomes "2". Also, the filter characteristic has coordinates, (Fx, Fy, Ma)=(−1, −1, 0), (1, −1, 0), (−1, 1, 0), and (1, 1, 0) in the coordinate space. That is, when (Fx, Fy)=(−1, −1), (1, −1), (−1, 1), and (1, 1), the power level Ma becomes "0".

Accordingly, since the filter characteristic of the filter installed in the prefilter means 31 has these values, the diagonal frequency component can be attenuated.

Fifth Embodiment

<Configuration of Compressive Coding Apparatus, the Second>

Figure 13:
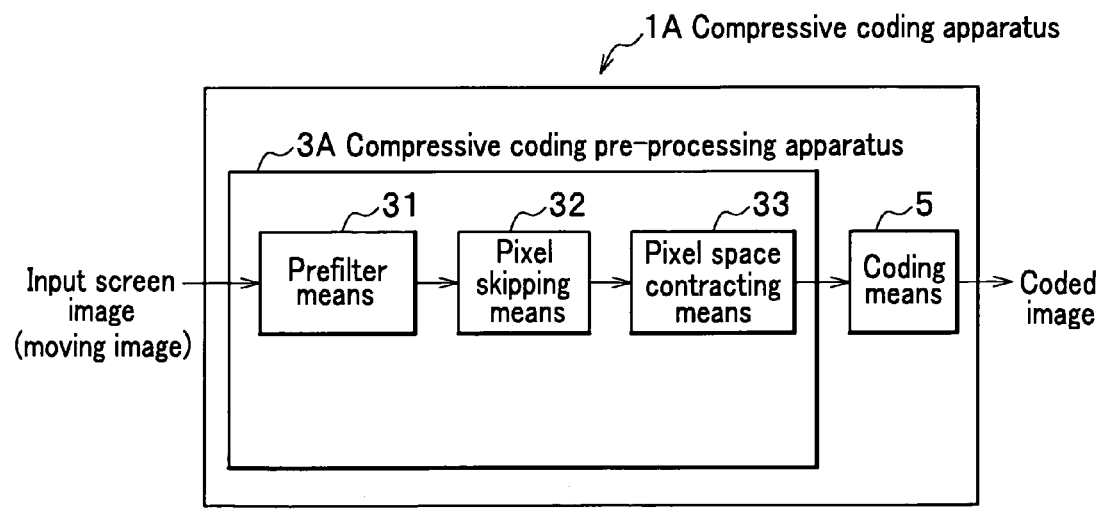
FIG. 13 is a block diagram of a compressive coding apparatus (including a compressive coding pre-processing apparatus (the second embodiment)) according to another embodiment of the present invention.

FIG. 13 is a block diagram of a compressive coding apparatus (including a compressive coding pre-processing apparatus). As shown in FIG. 13, a compressive coding apparatus 1A includes a compressive coding pre-processing apparatus 3A and a coding means 5. Meanwhile, in the compressive coding apparatus 1A, an identical configuration to that of the compressive coding apparatus 1 shown in FIG. 12 is labeled the same symbol, and an explanation of the identical configuration will be omitted.

The compressive coding pre-processing apparatus 3A shrinks an original image size, as well as reducing a number of pixel of an input image, that is, the image which forms the motion picture, before the compressive coding of the input image (motion picture), and includes prefilter means 31, pixel skipping means 32, and pixel space contracting means 33. The compressive coding pre-processing apparatus 3A may be included in the compressive coding apparatus 1A in some case and may be an external apparatus in other case. An identical configuration to that of the compressive coding pre-processing apparatus 3 shown in FIG. 12 is labeled with the same symbol, and an explanation of the identical configuration will be omitted.

The pixel skipping means 32 skips a pixel of an image signal by folding back a horizontal high frequency component of the image signal of which diagonal frequency component has been attenuated by the prefilter means 31 to that of a vertical high frequency component, or folding back the vertical high frequency component to the horizontal high frequency component.

The meaning of folding back of the horizontal high frequency component of the image signal to that of the vertical high frequency component, or folding back of the vertical high frequency component to the horizontal high frequency component is as follows. First, an image plane configured with X and Y axes is assumed by setting the horizontal frequency (frequency component in a horizontal direction) as u (X-axis) and the vertical frequency (frequency component in a vertical direction) as v (Y-axis). Next, a square which is rotated 90 degrees from another square is formed by uniting four crossing points between the X and Y axes and each side of the another square which is formed by uniting four vertexes having a same distance from the X and Y axes on the basis of the origin of the image plane. Then, the high frequency component is buried into (assigned to) a low frequency component by folding back the high frequency component at any one of lines (two lines parallel to the X-axis or two lines parallel to the Y-axis) which pass through midpoints between the four crossing points and the origin.

The pixel space contracting means 33 contracts a space formed by skipping the pixel of the image signal with the pixel skipping means 32. That is, an image size of the motion picture, of which diagonal frequency component has been attenuated with the prefilter means 31 and the pixel skipping means 32, and the horizontal high frequency component has been folded back to the vertical high frequency component or the vertical high frequency component has been folded back to the horizontal high frequency component, is shrunk by the pixel space contracting means 33.

The meaning of contracting of the space which is formed by skipping the pixel is as follows. First, an image plane is assumed by setting a horizontal frequency (frequency component in a horizontal direction) as u (X-axis) and a vertical frequency (frequency component in a vertical direction) as v (Y-axis). Next, a square is formed by uniting vertexes of four coordinates which have a same distance from the X and Y axes on the basis of the origin of the image plane. Then, distances from the origin of the image plane to the four crossing points between the X and Y axes and each side of the square are shortened by half.

Here, an example of a configuration and a summary of processing of the prefilter means 31 will be explained by referring to FIGS. 15A to 15C and FIGS. 16A to 16C (refer to FIG. 12 and FIG. 13, as needed).

Figure 15A:
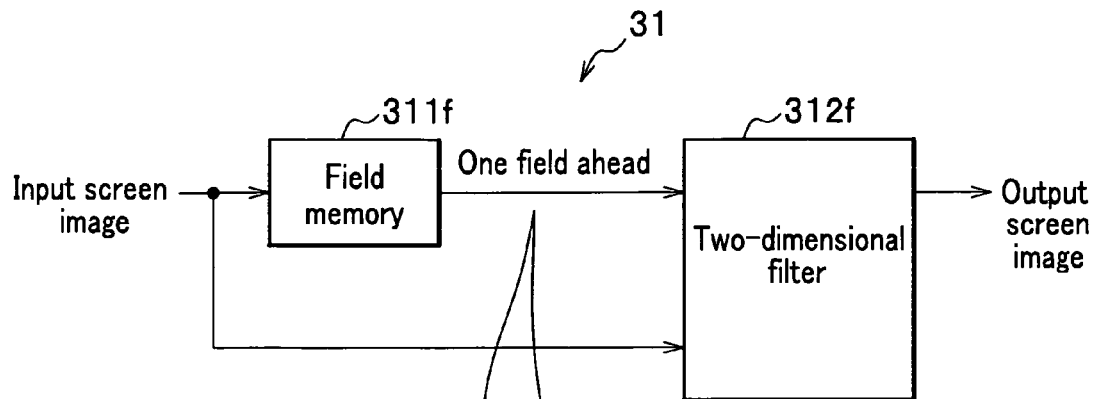
FIG. 15A is an illustration for explaining an example of a configuration of a prefilter means and a concept of processing of the prefilter means.

As shown in FIG. 15A, the prefilter means 31 includes a field memory 311$f$ and a two-dimensional filter 312$f$. The prefilter means 31 shown in FIG. 15A employs an interlaced image as an input image.

The field memory 311$f$ stores a field image of an input image (interlaced image), and outputs it to the two-dimensional filter 312$f$ by delaying a predetermined unit time (a time until the next one field image is input into the two-dimensional filter 312$f$). The field memory 311$f$ is configured, for example, with a frame memory or a buffer, which has a capacity for storing at least one field image.

Figure 15B:
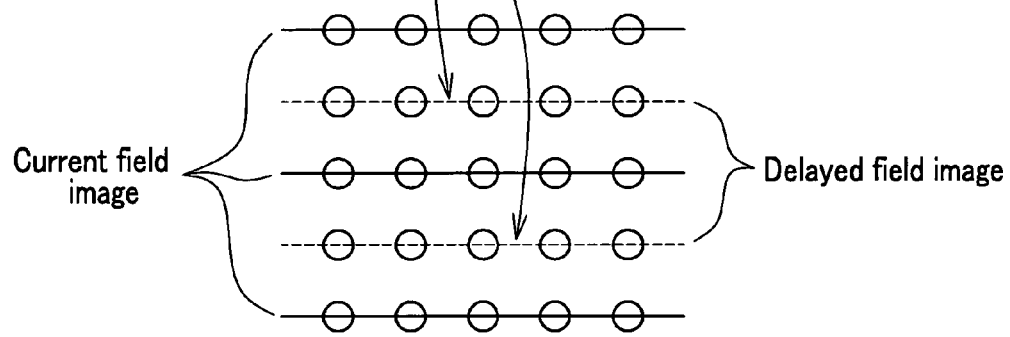
FIG. 15B is an illustration for explaining the example of the configuration of the prefilter means and the concept of processing.
Figure 15C:
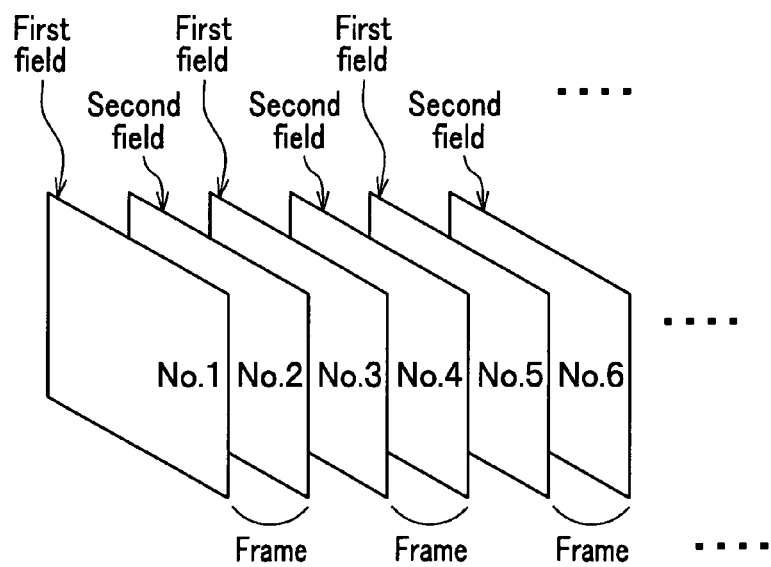
FIG. 15C is an illustration for explaining the example of the configuration of the prefilter means and the concept of processing.

Meanwhile, the interlaced image is, as shown in FIG. 15B, configured with a current field image (field image at present time), which is composed of a plurality of pixels arranged on a scanning line shown with a solid line, and a field image which is one field ahead of the current field image and composed of a plurality of pixels arranged on the scanning line shown with a dotted line. That is, the interlaced image is, as shown in FIG. 15C, configured with a first field image (current field image No. 1) and a second field image (one field ahead field image No. 2) to form a one frame. Similar to the above, the interlaced image is also configured with the first field image (current field image No. 3) and the second field image (one field ahead field image No. 4) to form the one frame, and the interlaced image is further configured with the first field image (current field image No. 5) and the second field image (one field ahead field image No. 6) to form the one frame. Meanwhile, the field image which is one field ahead of the current filed image is named as a delayed field image.

The two-dimensional filter 312$f$ implements filtering processing for successive field images which are composed of the delayed field image output from the field memory 311$f$ and the current field image of the interlaced image. Here, the filtering processing is, in the current field image and the delayed filed image, to attenuate the diagonal frequency component of frequency components which compose the current field image and the delayed filed image.

Figure 16A:
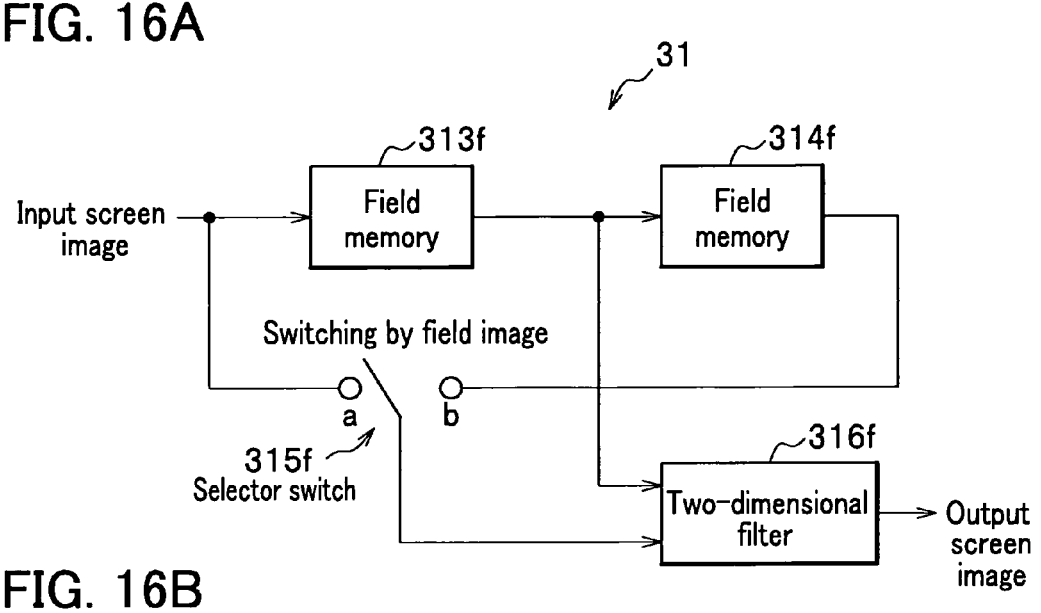
FIG. 16A is an illustration for explaining an example of a configuration of a prefilter means and a concept of processing of the prefilter means.

In addition, as shown in FIG. 16A, the prefilter means 31 includes a field memory (a first field memory) 313$f$, a field memory (a second field memory) 314$f$, a selector switch 315$f$, and a two-dimensional filter 316$f$. The interlaced image is employed in the prefilter means 31 shown in FIG. 16A as the input image.

The field memory 313$f$ stores the field image of the input image (interlaced image), and outputs it to the field memory 314$f$ and the two-dimensional filter 316$f$ with a predetermined unit time of delay. The field memory 313$f$ is configured with, for example, a frame memory or a buffer which has a capacity for storing at least one field image. Meanwhile, the field image which is output from the field memory 313$f$ is named as a first delayed field image.

The field memory 314$f$ stores the first delayed field image which is output from the field memory 313$f$, and outputs it to the selector switch 315$f$ with a predetermined unit time of delay. The field memory 314$f$ is configured with a frame memory or a buffer which has a capacity for storing at least one field image. Meanwhile, the field image which is output from the field memory 314$f$ is named as a second delayed field image.

The selector switch 315$f$ alternately outputs the current field image, which is a field image of the input image (interlaced image) at present time, and the second delayed field image output from the field memory 314$f$, to the two-dimensional filter 316$f$ by switching at every field image. When the selector switch 315$f$ is connected to a side "a", the current field image is output to the two-dimensional filter 316$f$, and when connected to a side "b", the second delayed field image is output to the two-dimensional filter 316$f$.

Meanwhile, a selection of the selector switch 315$f$ is implemented so that the current field image and the first delayed field image output from the field memory 313$f$, or the first delayed field image output from the field memory 313$f$ and the second delayed field image output from the field memory 314$f$, forms a frame unit (frame image unit) without fail.

The two-dimensional filter 316$f$ implements filtering processing by the frame unit which is formed with the current field image of the interlaced image output from the selector switch 315$f$ or the second delayed field image output from the field memory 314$f$, and the first delayed field image output from the field memory 313$f$. Here, the filtering processing is to attenuate, in the current or second delayed field image and the first delayed field image, the diagonal frequency component of the frequency components which compose the current or second delayed field image and the first delayed field image.

Figure 16B:
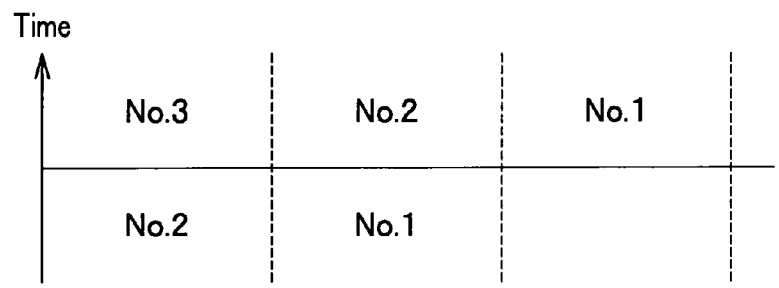
FIG. 16B is an illustration for explaining the example of the configuration of the prefilter means and the concept of processing.
Figure 16C:
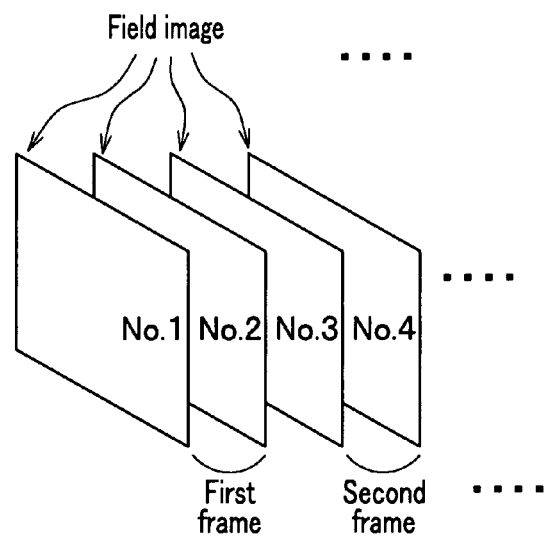
FIG. 16C is an illustration for explaining the example of the configuration of the prefilter means and the concept of processing.

Meanwhile, as shown in FIG. 16B and FIG. 16C, field images to be input into the two-dimensional filter 316$f$ are the current field image No. 3 output from the selector switch 315$f$ and the first delayed field image No. 2 output from the field memory 313$f$, and these two images are processed by the two-dimensional filter 316$f$ as a one frame. Also, the field images to be input into the two-dimensional filter 316$f$ are the current field image No. 2 output from the selector switch 315$f$ and the first delayed field image No. 1 output from the field memory 313$f$, and these two images are also processed with the two-dimensional filter 316$f$ as the one frame.

According to the compressive coding pre-processing apparatus 3 shown in FIG. 12, a volume of information generation at coding of the motion picture can be reduced by attenuating (reducing) the diagonal frequency component, which has less effect on the image quality degradation from view point of visual perception of human beings, with the prefilter means

31. That is, since an information volume of the coded image is suppressed, a high compression rate can be employed. In addition, since pixels of the diagonal frequency component are attenuated, a decrease of fineness of the image quality and a generation of the block noise can be suppressed, thereby resulting in prevention of the image quality degradation.

According to the compressive coding pre-processing apparatus 3A shown in FIG. 13, the volume of information generation at the coding of the motion picture can be reduced by attenuating (reducing) the diagonal frequency component, which has less effect on the image quality degradation from view point of visual perception of human beings, with the prefilter means 31. In addition, since a pixel is skipped by the pixel skipping means 32 and a space between pixels is contracted by the pixel space contracting means 33, the decrease of fineness of the image quality and the generation of the block noise can be suppressed, even if the coded image is transmitted with a low bit rate by increasing the compression rate at the coding of the motion picture. As a result, the image quality degradation can be prevented.

In addition, according to the compressive coding pre-processing apparatuses 3 and 3A shown in FIG. 12 and FIG. 13, respectively, when an interlaced image is input, a first field image of the interlaced image is delayed a predetermined unit time using the field memory 311$f$ of the prefilter means 31, and the filtering of the field image is implemented with the two-dimensional filter 312$f$ together with a second field image by forming a successive field image unit with the first field image. Therefore, the diagonal frequency component can be attenuated efficiently, thereby resulting in prevention of the image quality degradation.

Further, according to the compressive coding pre-processing apparatus 3 or the compressive coding pre-processing apparatus 3A shown in FIG. 12 or FIG. 13, when an interlaced image is input, a unit for the filtering is output so that the unit becomes a frame image unit through the selector switch 315$f$ of the prefilter means 31, that is, the current field image which is input at present time and the second delayed field image which is stored in the field memory 314$f$ and delayed a predetermined unit time are alternately output by switching the selector switch 315$f$ to form the frame image unit together with the first delayed field image, which is stored in the field memory 313$f$ and delayed a predetermined unit time. Then, the filtering is implemented with the two-dimensional filter 316$f$ by the frame image unit. As a result, the diagonal frequency component can be attenuated efficiently, thereby resulting in prevention of the image quality degradation.

Furthermore, according to the compressive coding apparatus 1 or the compressive coding apparatus 1A shown in FIG. 12 or FIG. 13, a motion picture can be transmitted by coding the motion picture without causing the image quality degradation of a decoded image after decoding by attenuating the diagonal frequency component of the motion picture in advance with the compressive coding pre-processing apparatus 3 or 3A, even if a conventional compressive coding scheme is employed and the motion picture is transmitted with a low bit rate more than ever before.

<Operation of Compressive Coding Pre-Processing Apparatus>

Figure 17:
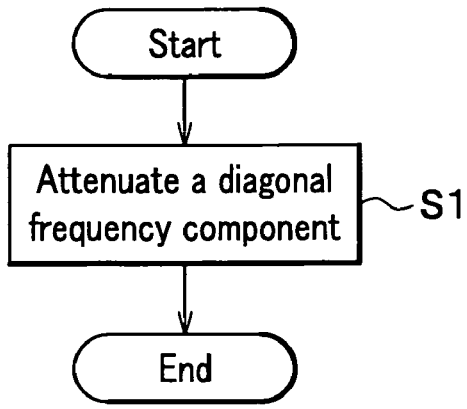
FIG. 17 is a flowchart for explaining an operation of a compressive coding pre-processing apparatus shown in FIG. 23.

Next, an operation of the compressive coding pre-processing apparatus 3 shown in FIG. 12 will be explained by referring to a flowchart shown in FIG. 17 (refer to FIG. 12, as needed).

The compressive coding pre-processing apparatus 3 attenuates the diagonal frequency component of the image by the prefilter means 31 (step S1).

Subsequently, the compressive coding pre-processing apparatus 3 outputs an image signal of which diagonal frequency component has been attenuated to the coding means 5 of the compressive coding apparatus 1.

Figure 18:
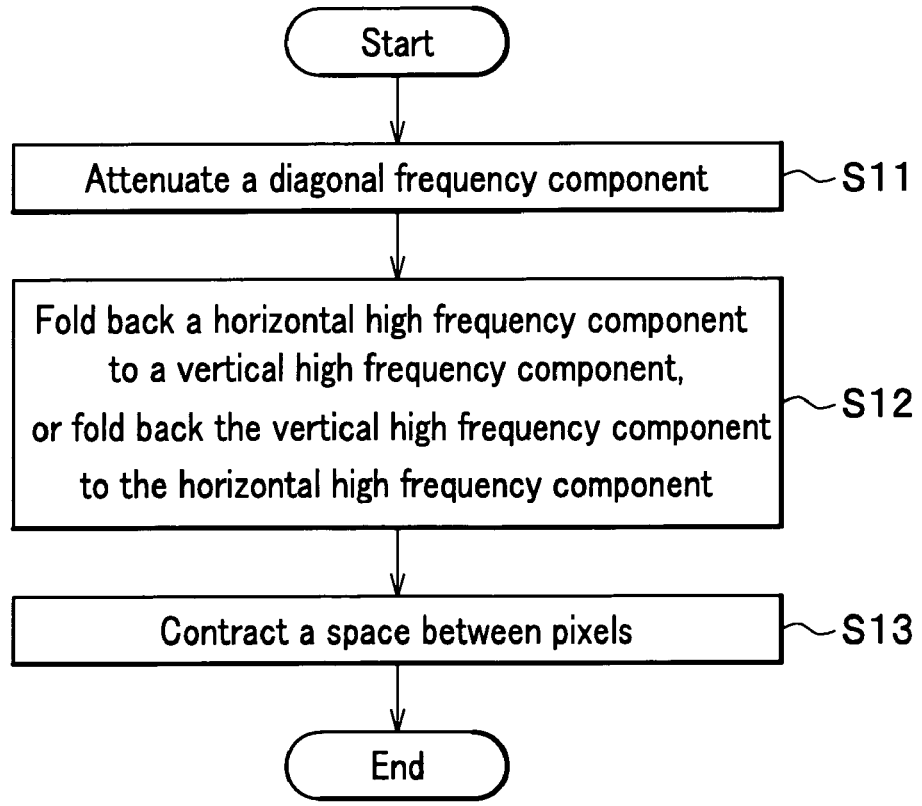
FIG. 18 is a flowchart for explaining an operation of a compressive coding pre-processing apparatus shown in FIG. 13.

Next, an operation of the compressive coding pre-processing apparatus 3A shown in FIG. 13 will be explained by referring to a flowchart shown in FIG. 18 (refer to FIG. 13, as needed).

First, the compressive coding pre-processing apparatus 3A attenuates the diagonal frequency component by the prefilter means 31 (step S11).

Subsequently, the compressive coding pre-processing apparatus 3A folds back the horizontal high frequency component to the vertical high frequency component, or folds back the vertical high frequency component to the horizontal high frequency component, of the image signal of which diagonal frequency component has been attenuated with the pixel skipping means 32 (step S12).

Then, the compressive coding pre-processing apparatus 3A contracts a space, which is formed by skipping the pixel with the pixel skipping means 32, with the pixel space contacting means 33 (step S13).

Next, the decompressive decoding apparatus for decoding the coded image will be explained.

Sixth Embodiment

<Configuration of Decompressive Decoding Apparatus, the First>

Figure 19:
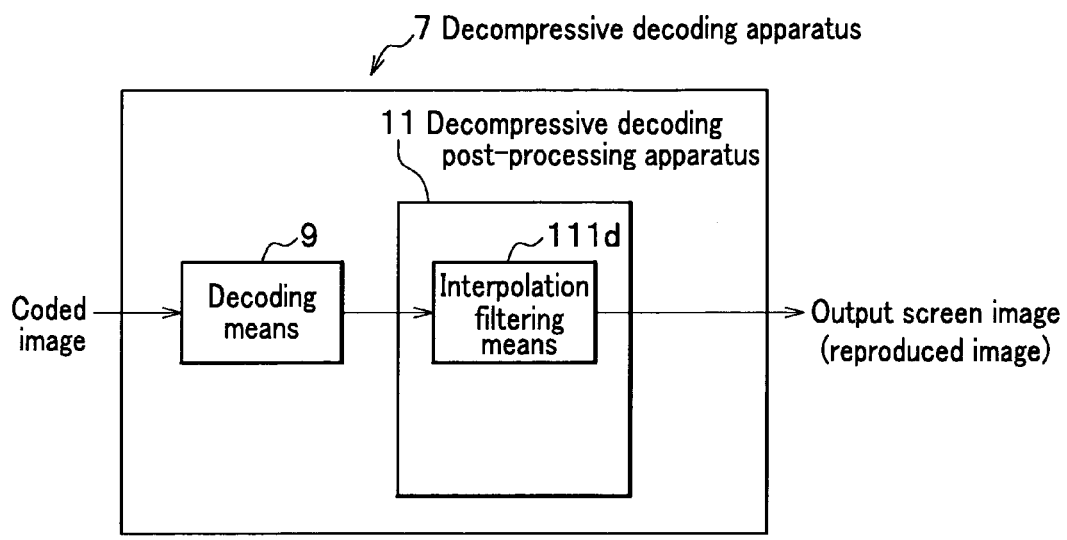
FIG. 19 is a block diagram of a decompressive decoding apparatus (including a decompressive decoding post-processing apparatus (the first embodiment)) according to an embodiment of the present invention.

FIG. 19 is a block diagram of the decompressive decoding apparatus (including the decompressive decoding post-processing apparatus). A decompressive decoding apparatus 7 includes a decoding means 9 and a decompressive decoding post-processing apparatus 11.

The decoding means 9 decodes an input coded image. A scheme which may be employed in the decoding means 9 includes, for example, MPEG-2 and AVC/H.264. That is, only necessity for the scheme of decompressive decoding is to be a scheme corresponding to that of compressive coding through which the coded image has been coded. Meanwhile, the coded image to be input to the decoding means 9 is the one coded with the compressive coding apparatus 1 shown in FIG. 12.

The decompressive decoding post-processing apparatus 11 approximates the decoded image which has been decoded by the decoding means 9 to an original motion picture, and includes an interpolation filtering means 111$d$.

The interpolation filtering means 111$d$ removes a noise component, which is generated in a diagonal direction, of the decoded image. That is, the interpolation filtering means 111$d$ outputs an output image (restored image) which is approximated to the original motion picture (image before coding at a transmission side) by removing the noise component generated at decoding.

Seventh Embodiment

<CONFIGURATION OF DECOMPRESSIVE DECODING APPARATUS, THE SECOND>

Figure 20:
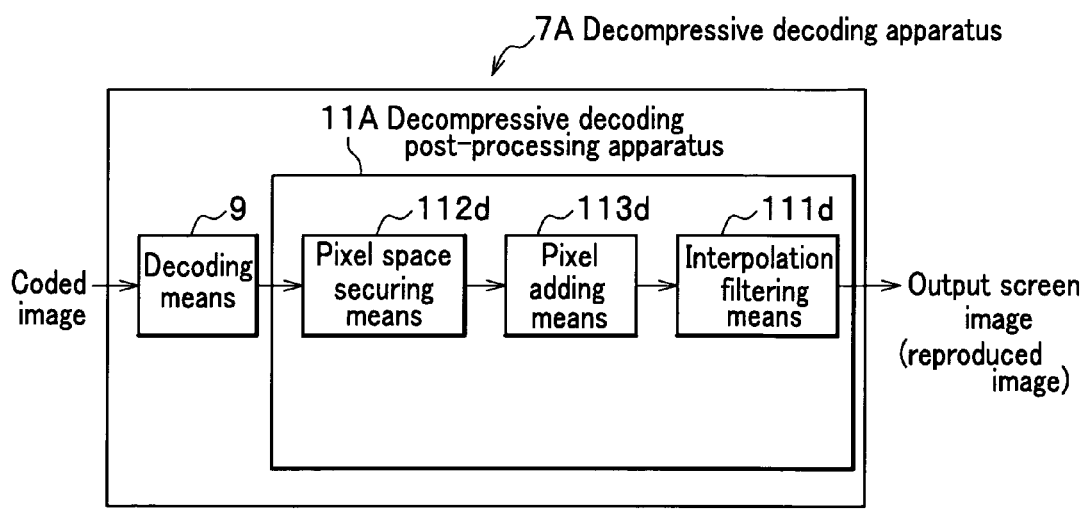
FIG. 20 is a block diagram of a decompressive decoding apparatus (including a decompressive decoding post-processing apparatus (the second embodiment)) according to another embodiment of the present invention.

FIG. 20 is a block diagram of the decompressive decoding apparatus (including the decompressive decoding post-processing apparatus). The decompressive decoding apparatus 7A includes a decoding means 9 and a decompressive decoding post-processing apparatus 11A. Since the decoding means 9 is identical to that of shown in FIG. 19, it is labeled with the same symbol, and an explanation of the decoding means 9 will be omitted. Meanwhile, a coded image input to the coding means 9 is the one coded by the compressive coding apparatus 1A shown in FIG. 13.

The decompressive decoding post-processing apparatus 11A approximates a decoded image which has been decoded by the decoding means 9 to an original motion picture, and includes a pixel space securing means 112d, a pixel adding means 113d, and the interpolation filtering means 111d. Meanwhile, since the interpolation filtering means 111d is identical to that of shown in FIG. 19, it is labeled with the same symbol, and an explanation of the interpolation filtering means 111d will be omitted.

The decoded image which has been decoded by the decoding means 9 is the one decoded from the coded image of which space between the pixels was contracted by the compressive coding apparatus 1A shown in FIG. 13. The pixel space securing means 112d secures a predetermined space between the pixels contracted in the above.

That is, the pixel space securing means 112d secures the predetermined space (a space corresponding to one to three pixels) by displacing a pixel included in the decoded image to a horizontal direction (right or left direction) on a horizontal line (scanning line).

The pixel adding means 113d adds a predetermined pixel to a position of the space which has been secured by the pixel space securing means 112d. The predetermined pixel is a pixel of which pixel value is zero. That is, the pixel adding means 113d adds the pixel to the decoded image by reversely folding back the horizontal high frequency component which has been folded back to the vertical high frequency component, or by reversely folding back the vertical high frequency component which has been folded back to the horizontal high frequency component, with the pixel skipping means 32 at a coding side (at compressive coding apparatus 1A).

In addition, the interpolation filtering means 111d removes the noise component generated in the diagonal direction when the horizontal high frequency component or the vertical high frequency component is reversely folded back with the pixel adding means 113d.

According to the decompressive decoding post-processing apparatus 7 shown in FIG. 19, even if the coded image, which has been compressed after attenuating the diagonal frequency component before coding, has a high compression rate, since the noise component which is generated in the diagonal direction at decoding is removed with the interpolation filtering means 111d, a decrease of fineness of the decoded image quality and the generation of the block noise can be prevented, thereby resulting in prevention of the image quality degradation.

According to the decompressive decoding post-processing apparatus 7A shown in FIG. 20, the predetermined space is secured between pixels of the decoded image which is decoded from the coded image with the pixel space securing means 112d, the predetermined pixel is added to a secured space with the pixel adding means 113d, and the noise component generated in the diagonal direction at the decoding is removed with the interpolation filtering means 111d. Accordingly, a decrease of fineness of the decoded image quality and a generation of the block noise can be prevented, thereby resulting in prevention of the image quality degradation.

In addition, according to the decompressive decoding apparatus 7 or the decompressive decoding apparatus 7A shown in FIG. 19 or FIG. 20, even if the coded image is transmitted with a low bit rate more than ever by employing a conventional compressive coding scheme, since the noise component, which is generated at the decoding in the diagonal direction, of the decoded image is removed after decoding with the decompressive decoding post-processing apparatus 11 or the decompressive decoding post-processing apparatus 11A, the decoded image can be approximated to the original motion picture.

<OPERATION OF DECOMPRESSIVE DECODING POST-PROCESSING APPARATUS>

Figure 21:
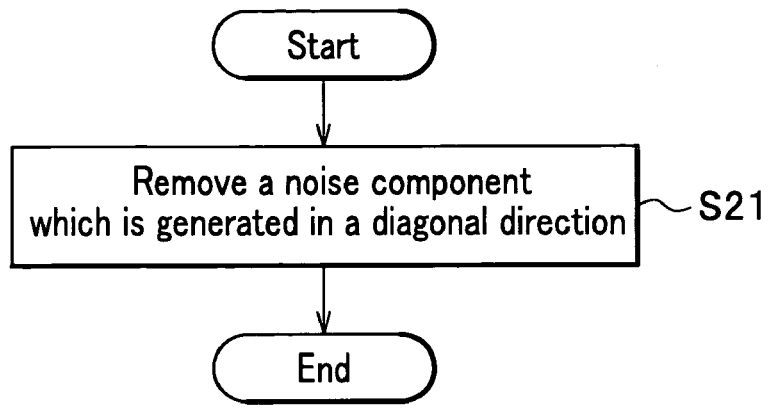
FIG. 21 is a flowchart for explaining an operation of decompressive decoding post-processing apparatus shown in FIG. 19.

Next, an operation of the decompressive decoding post-processing apparatus 11 shown in FIG. 19 will be explained by referring to a flowchart shown in FIG. 21 (refer to FIG. 19, as needed).

First, the decompressive decoding post-processing apparatus 11 removes the noise component which is generated at decoding in the diagonal direction with the interpolation filtering means 111d (step S21).

Subsequently, the decompressive decoding post-processing apparatus 11 outputs the decoded image, of which noise component has been removed by the interpolation filtering means 111d, as an output image (restored image).

Figure 22:
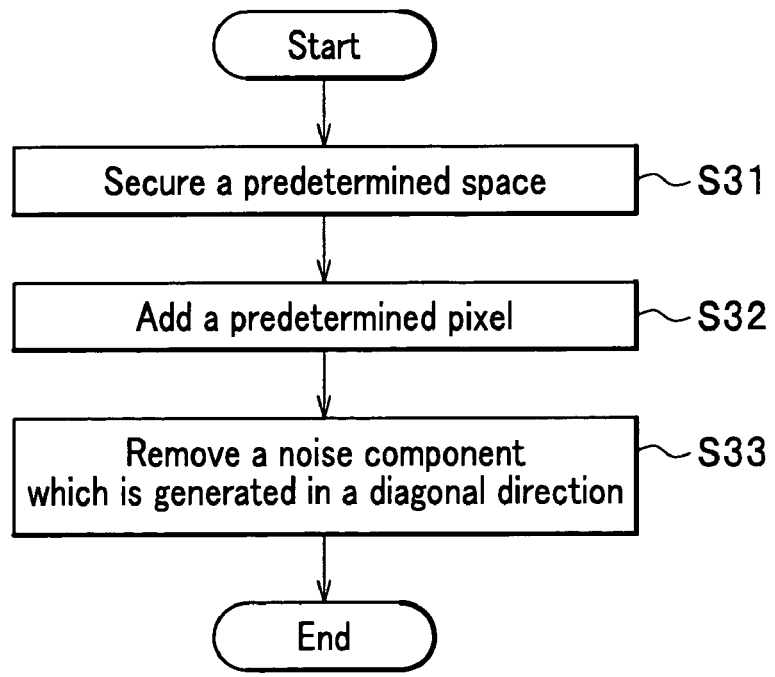
FIG. 22 is a flowchart for explaining an operation of decompressive decoding post-processing apparatus shown in FIG. 20.

Next, an operation of the decompressive decoding post-processing apparatus 11A shown in FIG. 20 will be explained by referring to a flowchart shown in FIG. 22 (refer to FIG. 20, as needed).

First, the decompressive decoding post-processing apparatus 11A provides (secures) a space between pixels of the decoded image with the pixel space securing means 112d (step S31). Next, the decompressive decoding post-processing apparatus 11A adds the predetermined pixel in the space, which has been secured with the pixel space securing means 112d, with the pixel adding means 113d (step S32).

Then, using the interpolation filtering means 11d, the decompressive decoding post-processing apparatus 11A removes the noise component, which is generated at decoding in the diagonal direction, of the decoded image which is decoded from the input coded image with the decoding means 9 (step S33).

<Supplementals>

Figure 23:
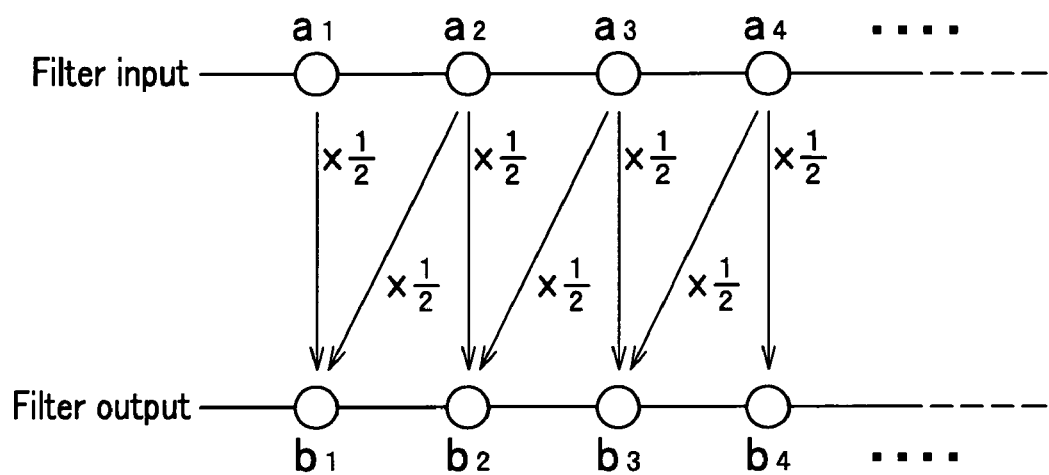
FIG. 23 is an illustration for explaining an example of processing of one-dimensional signal by assuming a common filter.

Next, processing of the prefilter means 31 will be supplementarily explained by referring to FIG. 23 (refer to FIG. 23 and FIG. 13, as needed). FIG. 23 is an illustration for explaining an example of processing of a one-dimensional signal by assuming a common filter. Filter inputs of time-series signals $a_1, a_2, a_3, a_4, \ldots$, are assumed, and filter outputs, $b_1, b_2, b_3, b_4, \ldots$, which are results of filtering processing of the time-series signals are also assumed.

Here, the simplest filter is assumed. If a relation between the filter inputs and the filter outputs is formulated, the relation is expressed as follows.

$$b_i = (a_i + a_{i+1})/2$$

In the simplest filter like the above, general linear processing works out by setting a given delay as shown in FIG. 23. However, the filter outputs $b_1$ and $b_2$ become equal in the prefilter means 31.

In the example shown in FIG. 23, it appears to be nonsense on first glance that the filter outputs $b_1$ and $b_2$ of the prefilter means 31 are equal because the signal is a one-dimensional signal. However, in an actual motion picture, since positions of the filter outputs are different to each other (positions on the scanning line are different), same value is never output twice. Therefore, a two-dimensional filter which processes the motion picture by one frame unit (two fields) can be configured as the prefilter means 31. An advantage of the prefilter means 31 is that since the processing is completed by a frame unit, a limit is added to moving information when the motion picture is coded. As a result, the volume of information which is input to the compressive coding means 5 can be reduced.

The preferred embodiments of the present invention have been explained. However, the present invention is not limited to the above embodiments. Various modifications of the present invention are possible without departing from the spirit of the present invention. For example, the prefilter of the present invention may be configured with software as well as with hardware. In addition, in the embodiment, the compressive coding pre-processing apparatuses 3, 3A, and the decompressive decoding post-processing apparatuses 11, 11A are configured to be included in the compressive coding apparatuses 1, 1A, and the decompressive decoding apparatuses 7, 7A. However, they may be configured to be an independent body.

What is claimed is:

1. A prefilter for use in a compressive coding apparatus, the compressive coding apparatus comprising the prefilter for limiting a frequency band of an input image and a compressive coding unit for implementing compressive coding of an image signal of which frequency band is limited with the prefilter, the prefilter comprising:
   time filter means for limiting a band of a moving region of images;
   two-dimensional, filter means connected to the time filter means for cutting off a high frequency band component mainly of a diagonal direction other than horizontal and vertical directions, in an output of the time filter means; and
   enhancement means connected to the two-dimensional filter means for enhancing frequency components of the horizontal and vertical directions of the images, that are attenuated with the two-dimensional filter means, to supply the compressive coding unit with an output of the enhancement means.

2. The prefilter according to claim 1,
   wherein the compressive coding apparatus implements the compressive coding of the input image into the image signal of which transmission rate is 64 Kbps to 192 Kbps.

3. The prefilter according to claim 1,
   wherein the compressive coding apparatus implements the compressive coding of a hi-vision signal into the image signal of which transmission rate is 3 Mbps to 20 Mbps.

4. The prefilter according to claim 3, wherein the compressive coding apparatus is used for broadcasting for a mobile terminal, the broadcasting using one segment of terrestrial digital broadcasting.

5. The prefilter according to claim 1,
   wherein the enhancement means comprises a first enhancer for enhancing the frequency component in the horizontal direction and a second enhancer for enhancing the frequency component in the vertical direction, and the input image is processed with the time filter means, subsequently, processed with the two-dimensional filter means, and after that, processing with the first enhancer or the second enhancer is implemented by turns.

6. The prefilter according to claim 1,
   wherein the time filter means is an IIR time filter having a coefficient $\alpha$, and a range of the coefficient $\alpha$ is set to be $\frac{1}{16}$ to $\frac{3}{16}$.

7. The prefilter according to claim 1, further comprising means for detecting a moving quantity of the input images, and controlling a filtering operation of the time filter means based on a detected moving quantity.

8. The prefilter according to claim 1, further comprising means for detecting a scene change of the input images,
   wherein a filtering operation of the time filter means is suppressed at times before and after a detected scene change.

9. A decompressive decoding post-processing apparatus for approximating a coded image after decoding to an original motion picture, the coded image being produced by attenuating a diagonal frequency component of frequency components which compose an image of a motion picture, by skipping a pixel of an image signal of which diagonal frequency component is attenuated, and by implementing compressive coding of the motion picture after contracting a space formed by skipping the pixel, the decompressive decoding post-processing apparatus, comprising:
   pixel space securing means for securing a predetermined space between pixels of a decoded image which is produced by decoding the coded image;
   pixel adding means for adding a predetermined pixel to a position of the space secured by the pixel space securing means; and
   interpolation filtering means for removing a noise component, which is generated in a diagonal direction, corresponding to the predetermined pixel added by the pixel adding means.

10. A decompressive decoding apparatus, comprising:
    decoding means for decoding a coded image which is output from a compressive coding apparatus;
    a decompressive decoding post-processing apparatus comprising pixel space securing means for securing a predetermined space between pixels of a decoded image which is produced by decoding the coded image;
    pixel adding means for adding a predetermined pixel to a position of the space secured by the pixel space securing means; and
    interpolation filtering means for removing a noise component, which is generated in a diagonal direction, corresponding to the predetermined pixel added by the pixel adding means.

11. The decompressive decoding apparatus according to claim 10, comprising the compressive coding apparatus, and wherein the compressive coding apparatus comprises:
    a compressive coding pre-processing apparatus having prefilter means for attenuating a diagonal frequency component of frequency components which compose an image of a motion picture before the compressive coding apparatus implements compressive coding of the motion picture; and
    coding means for implementing compressive coding of a motion picture which is output from the compressive coding pre-processing apparatus.

12. The decompressive decoding apparatus according to claim 10, comprising the compressive coding apparatus, and wherein the compressive coding apparatus comprises:
    the compressive coding apparatus is for reducing a number of pixels of each image which forms a motion picture before the compressive coding apparatus implements compressive coding of the motion picture,
    the compressive coding apparatus comprising:

a compressive coding pre-processing apparatus comprising prefilter means for attenuating a diagonal frequency component of frequency components which compose the each image;

pixel skipping means for skipping a pixel of an image signal of which diagonal frequency component is attenuated by the prefilter means, by implementing one of operations of folding back a horizontal high frequency component to a vertical high frequency component and folding back the vertical high frequency component to the horizontal high frequency component;

pixel space contracting means for contracting a space of the pixel which is skipped by the pixel skipping means; and coding means for implementing compressive coding of a motion picture which is output from the compressive coding pre-processing apparatus.

13. The decompressive decoding apparatus according to claim 11, wherein, when the motion picture is an interlaced image, the prefilter means comprises:

a field memory for delaying a field image of the interlaced image; and a two-dimensional filter for attenuating the diagonal frequency component of frequency components which compose successive field images formed with the field image which is delayed a predetermined unit time by the field memory and the field image which is input at present.

14. The decompressive decoding apparatus according to claim 12, wherein, when the motion picture is an interlaced image, the prefilter means comprises:

a field memory for delaying a field image of the interlaced image; and a two-dimensional filter for attenuating the diagonal frequency component of frequency components which compose successive field images formed with the field image which is delayed a predetermined unit time by the field memory and the field image which is input at present.

15. The decompressive decoding apparatus according to claim 11, wherein the prefilter means comprises:

a first field memory for delaying the field image of the motion picture;

a second field memory for delaying the field image which is output from the first field memory;

a selector switch for switching the field image which is delayed a predetermined time unit by the second field memory and the field image which is input at present to form a frame image unit; and a two-dimensional filter for attenuating the diagonal frequency component of frequency components which compose the frame image comprising the field image which is output by switching the selector switch and the field image which is stored in the first field memory and delayed a predetermined time unit.

16. The decompressive decoding apparatus according to claim 12, wherein the prefilter means comprises:

a first field memory for delaying the field image of the motion picture;

a second field memory for delaying the field image which is output from the first field memory;

a selector switch for switching the field image which is delayed a predetermined time unit by the second field memory and the field image which is input at present to form a frame image unit; and a two-dimensional filter for attenuating the diagonal frequency component of frequency components which compose the frame image comprising the field image which is output by switching the selector switch and the field image which is stored in the first field memory and delayed a predetermined time unit.

17. The decompressive decoding apparatus according to claim 10, wherein the decoding means for decoding a coded image which is output from a compressive coding apparatus performs compressive coding of a motion picture after attenuating a diagonal frequency component of frequency components which compose an image of the motion picture.

* * * * *